(12) United States Patent
Nikitin et al.

(10) Patent No.: US 9,424,399 B2
(45) Date of Patent: Aug. 23, 2016

(54) AVAILABILITY OF PERMISSION MODELS IN ROAMING ENVIRONMENTS

(75) Inventors: Egor Nikitin, Bellevue, WA (US); Viswanath Vadlamani, Sammamish, WA (US); Alexander Kochis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 816 days.

(21) Appl. No.: 12/464,467

(22) Filed: May 12, 2009

(65) Prior Publication Data

US 2010/0293622 A1 Nov. 18, 2010

(51) Int. Cl.
*G06F 21/10* (2013.01)

(52) U.S. Cl.
CPC .............. *G06F 21/10* (2013.01); *G06F 21/105* (2013.01); *G06F 2221/0777* (2013.01)

(58) Field of Classification Search
CPC ........................................................ G06F 21/10
USPC ............................................. 705/50–79, 901
See application file for complete search history.

(56) References Cited

U.S. PATENT DOCUMENTS

| | | |
|---|---|---|
| 5,138,712 A | 8/1992 | Corbin |
| 5,260,999 A | 11/1993 | Wyman |
| 5,390,297 A | 2/1995 | Barber et al. |
| 5,579,222 A | 11/1996 | Bains et al. |
| 6,009,401 A | 12/1999 | Horstmann |
| 6,134,659 A | 10/2000 | Sprong et al. |
| 6,169,976 B1 | 1/2001 | Colosso |
| 6,223,291 B1 | 4/2001 | Puhl et al. |
| 6,243,468 B1 | 6/2001 | Pearce et al. |
| 6,260,141 B1 | 7/2001 | Park |
| 6,339,826 B2 | 1/2002 | Hayes, Jr. et al. |
| 6,510,466 B1 | 1/2003 | Cox et al. |
| 6,728,766 B2 | 4/2004 | Cox et al. |
| 6,799,271 B2 | 9/2004 | Kugai |

(Continued)

FOREIGN PATENT DOCUMENTS

| | | |
|---|---|---|
| CN | 1149219 | 5/1997 |
| CN | 1539117 | 10/2004 |

(Continued)

OTHER PUBLICATIONS

"Final Office Action", U.S. Appl. No. 12/464,300, (Dec. 1, 2011), 19 pages.

(Continued)

*Primary Examiner* — James A Reagan
(74) *Attorney, Agent, or Firm* — Timothy Churna; Kate Drakos; Micky Minhas

(57) ABSTRACT

A request for a digital license associated with a software product is received from a device. The request includes a user ID of a user of the device, with the digital license having been generated in response to a request to activate the software product with a product key. A check is made as to whether a digital license bound to the user ID is available, and also whether the digital license can be returned to the device in accordance with the terms of the digital license. The digital license is returned if the digital license can be returned to the device in accordance with the terms (regardless of whether the device is a same device from which the product key was activated), and otherwise is not returned. The digital license can be removed from the device in accordance with the terms of the digital license.

20 Claims, 11 Drawing Sheets

(56) References Cited

U.S. PATENT DOCUMENTS

| | | |
|---|---|---|
| 6,799,277 B2 | 9/2004 | Colvin |
| 6,968,384 B1 | 11/2005 | Redding et al. |
| 7,076,468 B2 | 7/2006 | Hillegass et al. |
| 7,140,042 B2 | 11/2006 | Verma |
| 7,171,662 B1 | 1/2007 | Misra et al. |
| 7,194,439 B2 | 3/2007 | Kassan et al. |
| 7,483,860 B2 | 1/2009 | Cronce et al. |
| 7,568,096 B2 | 7/2009 | Evans et al. |
| 7,845,011 B2 | 11/2010 | Hirai |
| 7,890,428 B2 | 2/2011 | Brooks et al. |
| 2002/0010681 A1* | 1/2002 | Hillegass ............... G06F 21/10 705/59 |
| 2002/0019814 A1 | 2/2002 | Ganesan |
| 2002/0065781 A1 | 5/2002 | Hillegass et al. |
| 2002/0107809 A1 | 8/2002 | Biddle et al. |
| 2002/0147929 A1 | 10/2002 | Rose |
| 2003/0149670 A1 | 8/2003 | Cronce |
| 2003/0204560 A1 | 10/2003 | Chen et al. |
| 2004/0039705 A1 | 2/2004 | Svancarek et al. |
| 2004/0267590 A1 | 12/2004 | Clark et al. |
| 2005/0010532 A1 | 1/2005 | Garibay et al. |
| 2005/0086174 A1 | 4/2005 | Eng |
| 2005/0091168 A1 | 4/2005 | Gunyakti et al. |
| 2005/0144139 A1 | 6/2005 | Zhuge et al. |
| 2005/0183021 A1 | 8/2005 | Allen et al. |
| 2005/0251487 A1 | 11/2005 | Evans et al. |
| 2006/0026604 A1 | 2/2006 | Tan et al. |
| 2006/0048236 A1 | 3/2006 | Multerer et al. |
| 2006/0064349 A1 | 3/2006 | Multerer et al. |
| 2006/0101521 A1 | 5/2006 | Rabinovitch |
| 2006/0179002 A1 | 8/2006 | Brooks et al. |
| 2006/0190409 A1 | 8/2006 | Hillegass et al. |
| 2006/0242081 A1 | 10/2006 | Ivanov et al. |
| 2006/0288422 A1 | 12/2006 | Liu et al. |
| 2007/0027815 A1 | 2/2007 | Sobel et al. |
| 2007/0043680 A1 | 2/2007 | Fox et al. |
| 2007/0101345 A1 | 5/2007 | Takagi |
| 2007/0107067 A1 | 5/2007 | Fountain |
| 2007/0143222 A1 | 6/2007 | Chicks et al. |
| 2007/0198428 A1 | 8/2007 | Satkunanathan et al. |
| 2008/0005787 A1 | 1/2008 | Aldred |
| 2008/0016178 A1 | 1/2008 | Portugali |
| 2008/0028206 A1 | 1/2008 | Sicard et al. |
| 2008/0082446 A1 | 4/2008 | Hicks et al. |
| 2008/0083040 A1 | 4/2008 | Dani et al. |
| 2008/0113789 A1 | 5/2008 | Canessa et al. |
| 2008/0127168 A1 | 5/2008 | Tremblay et al. |
| 2008/0134295 A1 | 6/2008 | Bailey et al. |
| 2008/0148363 A1* | 6/2008 | Gilder ............... G06F 21/10 726/4 |
| 2008/0222043 A1 | 9/2008 | Chefalas et al. |
| 2008/0306786 A1 | 12/2008 | Lonowski et al. |
| 2008/0319779 A1 | 12/2008 | Hughes et al. |
| 2009/0119757 A1* | 5/2009 | Acuna ............... G06F 21/6245 726/5 |
| 2009/0119779 A1 | 5/2009 | Dean |
| 2009/0228487 A1 | 9/2009 | Yoshida |
| 2010/0293103 A1 | 11/2010 | Nikitin |
| 2010/0293536 A1 | 11/2010 | Nikitin |

FOREIGN PATENT DOCUMENTS

| | | |
|---|---|---|
| CN | 102422295 | 4/2012 |
| EP | 1939784 | 7/2008 |
| JP | 2002157408 | 5/2002 |
| JP | 2002297254 | 10/2002 |
| JP | 2004206187 | 7/2004 |
| JP | 2005011322 | 1/2005 |
| JP | 2005535984 | 11/2005 |
| JP | 2006048648 | 2/2006 |
| JP | 2006216041 | 8/2006 |
| JP | 2008140181 | 6/2008 |
| JP | 2008262580 | 10/2008 |
| JP | 2008547088 | 12/2008 |
| JP | 2012033049 A * | 2/2012 ............... G06F 21/22 |
| TW | 200703030 | 1/2007 |
| TW | 200841207 | 10/2008 |
| WO | WO-2006104507 | 10/2006 |
| WO | WO-2010132228 | 11/2010 |

OTHER PUBLICATIONS

"Final Office Action", U.S. Appl. No. 12/464,396, (Oct. 27, 2011), 14 pages.

"Non-Final Office Action", U.S. Appl. No. 12/464,396, (Dec. 9, 2010), 15 pages.

"PCT Search Report and Written Opinion", Application No. PCT/US2010/033035, (Dec. 15, 2010), 9 pages.

"PCT Search Report and Written Opinion", Application No. PCT/US2010/033461, (Dec. 15, 2010), 8 pages.

Sovio, et al., "Defining Authorization Domains using Virtual Devices", Retrieved at <<http://ieeexplore.ieee.org/ielx5/8594/27233/01210181.pdf?arnumber=1210181>>, pp. 1-6.

"Choosing the Licensing Model", Retrieved at <<http://technet.microsoft.com/en-us/library/cc772900.aspx>>, Mar. 28, 2003, pp. 2.

"GoToMyPC Vs PC Anywhere", Retrieved at <<http://www.remotepcaccess.net/pc-anywhere.php>>, pp. 2.

Duncan, Geoff, "Microsoft Offers Xbox Live License Fix", retrieved at <<http://news.digitaltrends.com/news-article/17138/microsoft-offers-xbox-live-license-fix>>, Jun. 27, 2008, pp. 3.

"Transferring Content Licenses to a New Console", retrieved at <<http://www.xbox.com/en-US/support/systemuse/xbox360/licensemigration/>>, Mar. 17, 2009, pp. 2.

Kwok, et al., "A License Management Model to Support B2C and C2C Music Sharing", retrieved at <<http://www10.org/cdrom/posters/1008.pdf>>, pp. 2.

"Windows Media Personal License", retrieved at <<http://www.microsoft.com/windows/windowsmedia/forpros/drm/pluwiz.aspx>>, Mar. 18, 2009, pp. 4.

Mark, "Client Application Licensing", Retrieved at <<http://www.softgridguru.com/viewtopic.php?t=1975&sid=7fd9d53c3f238652c11f0ea4b46cf8bf>>, Jan. 15, 2007, pp. 5.

Li, et al., "Towards SLA Based Software License Management in Grid Computing", Retrieved at <<http://www.coregrid.net/mambo/images/stories/TechnicalReports/tr-0136.pdf>>, Jun. 25, 2008, pp. 12.

"Non-Final Office Action", U.S. Appl. No. 12/464,300, (Jun. 27, 2011), 16 pages.

"Non-Final Office Action", U.S. Appl. No. 12/464,396, (Jul. 14, 2011), 12 pages.

"Non-Final Office Action", U.S. Appl. No. 12/464,396, (Aug. 8, 2011), 12 pages.

"Restriction Requirement", U.S. Appl. No. 12/464,396, (Jun. 10, 2011), 7 pages.

"Foreign Office Action", CN Application No. 201080020727.6, Nov. 1, 2013, 11 pages.

"Foreign Notice of Allowance", CN Application No. 201080020727.6, Feb. 11, 2015, 5 Pages.

"Foreign Notice of Allowance", TW Application No. 99112585, Mar. 10, 2015, 4 pages.

"Foreign Office Action", AU Application No. 2010247992, Jan. 19, 2015, 4 Pages.

"Foreign Office Action", AU Application No. 2010248069, Jan. 16, 2015, 5 pages.

"Foreign Office Action", AU Application No. 2010247992, Apr. 24, 2014, 3 Pages.

"Foreign Office Action", AU Application No. 2010248069, Apr. 8, 2014, 4 Pages.

"Foreign Office Action", CN Application No. 201080020727.6, May 4, 2014, 14 Pages.

"Foreign Office Action", JP Application No. 2012-510849, Mar. 28, 2014, 6 Pages.

"Non-Final Office Action", U.S. Appl. No. 12/464,300, Apr. 9, 2014, 14 pages.

"Foreign Notice of Allowance", RU Application No. 2011145978, Apr. 20, 2015, 15 Pages.

(56) References Cited

OTHER PUBLICATIONS

"Foreign Notice of Allowance", JP Application No. 2012-510844, Jul. 22, 2014, 4 pages.
"Foreign Notice of Allowance", JP Application No. 2012-510849, Jul. 11, 2014, 4 Pages.
"Foreign Office Action", CN Application No. 201080020795.2, May 28, 2014, 8 Pages.
"European Search Report", Application No. 10775265.1, (Aug. 16, 2013), 5 pages.
"Non-Final Office Action", U.S. Appl. No. 12/464,396, (Sep. 3, 2010),13 pages.
Kwok, et al., "A License Management Model to Support B2C and C2C Music Sharing", retrieved from <http://www10.org/cdrom/posters/1008.pdf>, (Jan. 2001), 2 pages.
"Foreign Office Action", CN Application No. 201080020727.6, Aug. 4, 2014, 12 Pages.
"Foreign Office Action", JP Application No. 2012-510844, Mar. 28, 2014, 5 pages.
"Non-Final Office Action", U.S. Appl. No. 12/464,396, Aug. 28, 2014, 16 pages.
"Foreign Office Action", AU Application No. 2010247992, Oct. 1, 2014, 4 pages.
"Foreign Office Action", AU Application No. 2010248069, Sep. 11, 2014, 6 Pages.
"Foreign Office Action", CN Application No. 201080020795.2, Nov. 14, 2014, 10 Pages.
"Non-Final Office Action", U.S. Appl. No. 12/464,300, Nov. 20, 2014, 18 pages.
"Search Report", TW Application No. 99112585, Nov. 7, 2014, 1 page.
"Foreign Office Action", TW Application No. 099111111, Nov. 17, 2014, 14 pages.
"Foreign Office Action", AU Application No. 2010248069, Nov. 12, 2014, 5 Pages.
"Foreign Office Action", Chinese Application No. 201080020795.2, Nov. 1, 2013, 12 pages.

\* cited by examiner

AVAILABILITY OF PERMISSION MODELS IN ROAMING ENVIRONMENTS

BACKGROUND

Software products that consumers purchase for use with their computers oftentimes have an associated product key or a similar software or hardware license. These product keys are typically printed on the disk or box that is sold to the consumer, or are electronically communicated to the consumer for some online purchases. To activate and use the product, the consumer enters the product key at his or her computer, and the computer accesses an activation server to have the product key authenticated and the software product activated. The product key is then associated with a unique computer hardware "signature" of the consumer's computer from which the activation request was received. While such usage of product keys can help avoid software piracy, it is not without its problems. Users often end up with multiple disks or boxes that they have to keep track of to keep the product keys, and can have difficulty in transferring the software product to another computer because the product key is associated with the particular computer from which the activation request was received. Such problems can decrease the usability of such software products and can increase user frustration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request for a digital license for a software product is received from a device. The request includes a user ID of a user of the device. If a digital license bound to the user ID is available and can be returned to the device in accordance with the terms of the digital license, then the digital license is returned to the device regardless of whether the device is a same device from which a product key for the digital license was activated; otherwise the digital license is not returned to the device.

In accordance with one or more aspects a request for a digital license associated with a software product is received from a device. The request includes a user ID of a user of the device, with the digital license having been generated in response to a request to activate the software product with a product key. A check is made as to whether a digital license bound to the user ID is available, and also whether the digital license bound to the user ID can be returned to the device in accordance with the terms of the digital license. The digital license bound to the user ID is returned if the digital license can be returned to the device in accordance with the terms, and otherwise returning of the digital license bound to the user ID is refused.

BRIEF DESCRIPTION OF THE DRAWINGS

The same numbers are used throughout the drawings to reference like features.

DETAILED DESCRIPTION

Availability of permission models in roaming environments is discussed herein. Generally, a software product is activated via a device using a product key associated with the software product. As part of the activation process, a digital license for the software product is returned to the device. This digital license, which can include the product key, is bound to a user ID of a user of the device. A user ID for the user can also optionally be created as part of the binding process. The digital license and product key, bound to the user ID, are also stored by a remote license service. The user can subsequently have multiple different devices retrieve the digital license and product key that is bound to his or her user ID, allowing the user to migrate the digital license to those devices and use the software product on those devices in accordance with the terms of the digital license. These different devices can be owned by the user, or alternatively can be owned by others but are simply being used by the user. Various additional information regarding the software product and/or digital license can also be maintained by the remote license service as discussed in more detail below.

Figure 1:
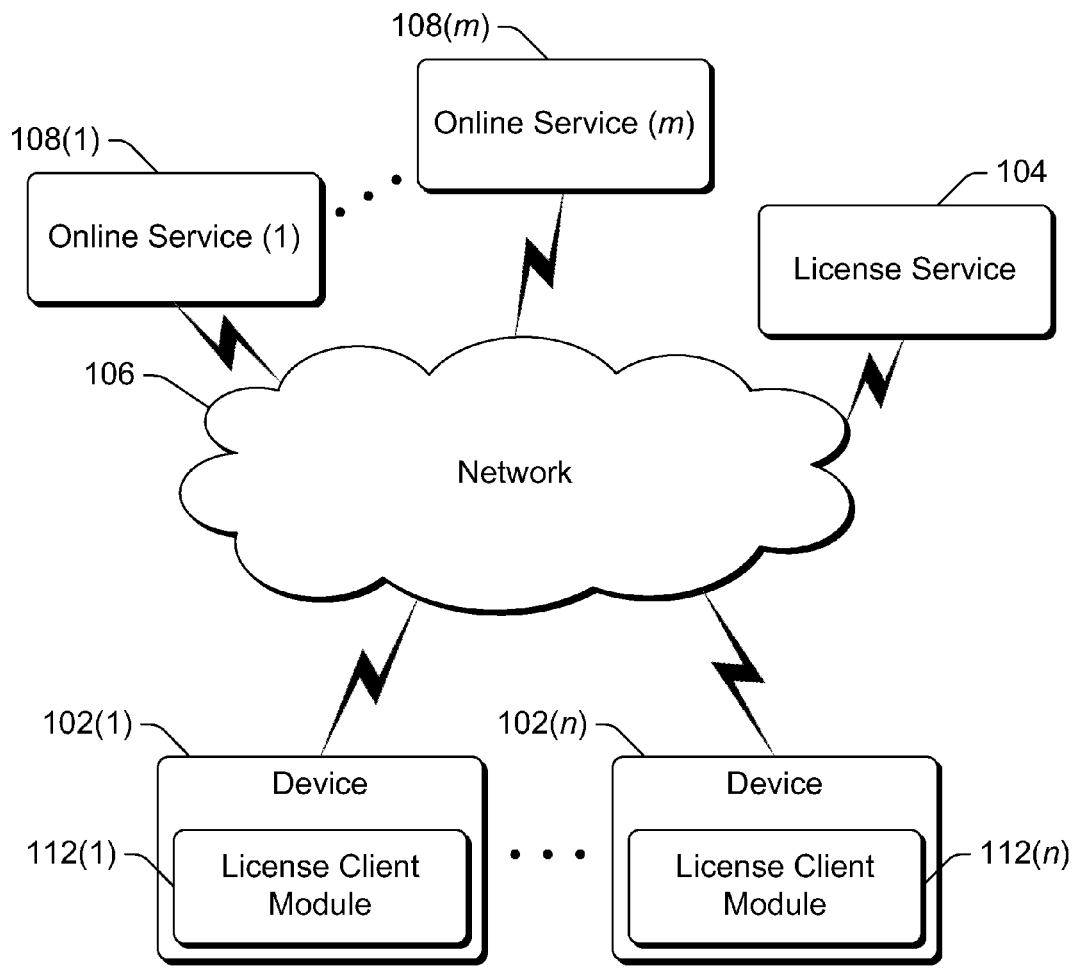
FIG. 1 illustrates an example system implementing the availability of permission models in roaming environments in accordance with one or more embodiments.

FIG. 1 illustrates an example system 100 implementing the availability of permission models in roaming environments in accordance with one or more embodiments. System 100 includes multiple (n) devices 102 that can communicate with a license service 104 via a network 106. Network 106 can be a variety of different networks, including the Internet, a local area network (LAN), a public telephone network, an intranet, other public and/or proprietary networks, combinations thereof, and so forth. License service 104 maintains licenses associated with or bound to user identifiers (IDs) of one or more users of devices 102. Devices 102 and/or license service 104 can also communicate with one or more (m) online services 108 via network 106.

Each device 102 can be a variety of different devices capable of running (e.g., consuming) software. For example, a device 102 can be a desktop computer, a server computer, a mobile station, an entertainment appliance, a set-top box communicatively coupled to a display device, a wireless phone, a personal digital assistant, a game console, an automotive computer, and so forth. Thus, devices 102 can range from full resource devices with substantial memory and processor resources (e.g., personal computers, game consoles) to low-resource devices with limited memory and/or processing resources (e.g., traditional set-top boxes, hand-held game consoles).

License service 104 as well as each online service 108 can be implemented by one or more of a variety of different computing devices. Similar to the discussion of device 102, the computing devices implementing license service 104 and each online service 108 can be a variety of different devices, ranging from full resource devices with substantial memory and processor resources to low-resource devices with limited memory and/or processing resources. Additionally, it is to be appreciated that services 104 and 108 can be implemented by different computing devices, or alternatively one or more of services 104 and 108 can be implemented by a same computing device. Further, each of the services 104 and 108 can be implemented by multiple different systems communicating with one another to provide a seamless experience for users of devices 102.

Each device 102 includes a license client module 112. A device 102 communicates with one or more online services 108 to activate a software product on the device 102 using a product key, and obtain a digital license for the software product. A software product as used herein refers to a software program that can be run or executed on a device 102. The software program can be a standalone program, or alternatively a module or component that is designed to work in conjunction with another software program. A software product can be a variety of different types of software programs, such as game programs, utility programs, word processing programs, database programs, operating systems, drawing programs, and so forth. Additionally, although typically a software program, a software product can also be or include firmware modules or components, or other firmware instructions.

Once activated, the user can then use the software product on the device 102 in accordance with the terms of the digital license. License client module 112 on the device 102 also communicates with license service 104 to store the digital license bound to a user ID of a user of device 102. License service 104 stores the digital license and product bound to the user ID, allowing the user with that user ID to subsequently retrieve the digital license on the same or a different device 102. This user ID is authenticated by, and/or provided by an authentication service for an online service as discussed in more detail below.

References are made herein to encryption and cryptography, which can include symmetric key encryption and cryptography and public key encryption and cryptography with public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by comparing a verification value obtained using the public key with the original data, and if the two are the same then be assured that no one has tampered with or altered the data that was digitally signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key.

Figure 2:
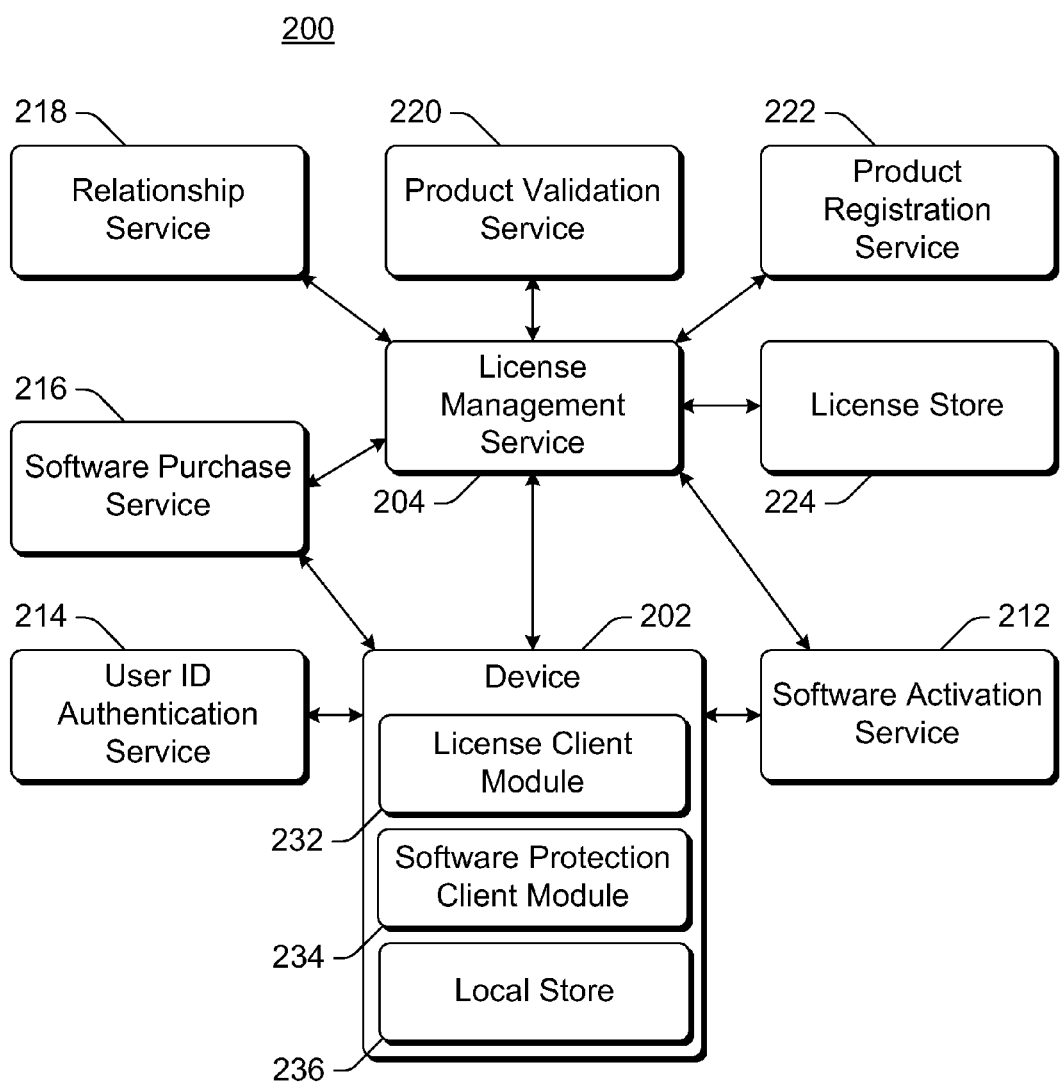
FIG. 2 illustrates an example system implementing the availability of permission models in roaming environments in accordance with one or more embodiments.

FIG. 2 illustrates an example system 200 implementing the availability of permission models in roaming environments in accordance with one or more embodiments. System 200 illustrates examples of various components of system 100 of FIG. 1 in additional detail in accordance with one or more embodiments. System 200 includes a device 202, which can be for example a device 102 of FIG. 1. System 200 also includes a license management service 204, which can be for example a license service 104 of FIG. 1. System 200 also includes additional services which can be, for example, online services 108 of FIG. 1. These additional services include: software activation service 212, user ID authentication service 214, software purchase service 216, relationship service 218, product validation service 220, and product registration service 222. System 200 also includes a license store 224 in which digital licenses can be stored by license management service 204. The services 204 and 212-222 can also be referred to as remote services as they are typically located in different physical locations than device 202 (e.g., in different rooms, different buildings, different states or countries, and so forth).

Device 202 includes a license client module 232, a software protection client module 234, and a local store 236. Local store 236 is implemented on a local storage device of device 202, such as a magnetic disk, optical disc, solid state memory (e.g., Flash memory, RAM, etc.), and so forth. This local storage device of device 202 can be a fixed or removable storage medium or media. User ID authentication service 214 is an authentication service for an online service. The online service can provide a variety of features and functionality to the user of device 202. In one or more embodiments, this online service is the Microsoft Windows Live™ network of internet services. Additional information regarding the Microsoft Windows Live™ network of internet services is available from Microsoft Corporation of Redmond, Wash. It is to be appreciated, however, that alternatively other online services can be used.

Regardless of the particular online service used, the user of device 202 has a user ID for that online service. The user ID for that online service identifies that particular user and allows him or her to be distinguished from other users of that online service. The user can log into or sign into the online service by providing his or her identifying information to license client module 232, which in turn passes the identifying information to user ID authentication service 214. This passing of the identifying information is typically performed in a secure manner, such as by encrypting the identifying information. This identifying information can take a variety of different forms, such as a user ID and password combination, a fingerprint, a particular passphrase, a digital certificate, and so forth. Service 214 receives this identifying information and compares the received information to information previously stored by service 214. If the received and previously stored information match (e.g., are the same), then the user is authenticated and user credentials are returned to module 232. If the received and previously stored information do not match (e.g., are not the same), then the user is not authenticated and user credentials are not returned to module 232.

The user credentials identify the current user of device 202, which is the user logged into or signed into the online service. The user credentials can take a variety of different forms. In one or more embodiments, the credentials are a statement of the user ID of the current user of device 202, with the statement being digitally signed by service 214. This statement can also be referred to as a secure ticket or a token, and in one or more embodiments is digitally signed using a private key of a public/private key pair of service 214. Device 202 can pass the user credentials to other devices and services (e.g., license management service 204), which in turn can rely on the user ID in the user credentials as being the user ID of the current user of device 202. Such other devices and services can have such a reliance because the user credentials are provided by a trusted party (user ID authentication service 214).

Software activation service 212 is accessed by device 202 to activate a software product. The software product can be purchased or otherwise acquired by a user of device 202 in a variety of different manners. In one or more embodiments, the software product can be obtained online or electronically from software purchase service 216. Software purchase service 216 can be, for example, an online or electronic store that sells software products. Additionally, the software product can be obtained from other sources, such as a local software store (e.g., a brick and mortar business), a device reseller or distributor, another user, and so forth.

Regardless of the manner in which the software product is acquired, the software product has an associated product key. The product key associated with the software product helps verify that the software product has not been improperly copied. The product key can take a variety of different forms. In one or more embodiments, the product key is a sequence of alphanumeric characters, although other symbols or characters can alternatively be used. For example, the product key can be a serial number, a set of five 5-character strings, and so forth. The product key associated with the software product can be obtained in a variety of different manners, such as being printed on a box or distribution medium (e.g., an optical disc) for the software product, being displayed or electronically mailed to the user as part of an online or electronic purchase, and so forth.

In other embodiments, however, the product key can take different forms. For example, the product key can be an indication that a particular hardware device is present at device 202, such as the presence of a particular optical disc (e.g., a CD or DVD), the presence of a particular solid state memory device (e.g., a Universal Serial Bus (USB) Flash memory device), the presence of a particular smartcard, the presence of a dongle, and so forth. The product key can be stored on such a hardware device and obtained by software protection client module 234, or alternatively software protection client module 234 can detect the presence of such a hardware device and generate a product key (e.g., a signed digital certificate certifying that module 234 has detected the presence of the particular device).

Given the product key associated with the software product, software protection client module 234 communicates the product key to software activation service 212. This communication between module 234 and service 212 can be done in a secure manner, such as using a variety of different encryption techniques. Software activation service 212 analyzes the product key and determines, based on the product key, whether the software product can be activated. This analysis can be performed in a variety of manners, and can include determining whether the product key is authentic, determining whether the product key has previously been activated (and has not since been deactivated), and so forth.

Based on the analysis of the product key, software activation service 212 determines whether the software product is to be activated. If service 212 determines that the software product is not to be activated, then an indication of such a denial or refusal to activate the software product is returned to software protection client module 234. However, if service 212 determines that the software product is to be activated, then service 212 attempts to generate a digital license. If service 212 can generate a digital license, then server 212 returns a digital license for the software product to module 234. If service 212 is not able to generate a license for some reason (e.g., the product key has already been used to activate the product), then no digital license is returned to module 234. Service 212 can generate this digital license, or alternatively another component or module can generate the digital license on behalf of service 212. Software activation service 212 also optionally communicates an indication of the determination of whether the software product is activated to license management service 204 and/or product validation service 220. This indication allows a history of the activation based on the product key to be maintained, as discussed in more detail below.

If the software product is to be activated, then the digital license is returned to software protection client module 234. In one or more embodiments, the digital license is returned in a secure manner, such as via an encrypted communication channel, by encrypting the digital license with a public key of device 202 and/or software protection client module 234, and so forth.

The digital license generated by (or on behalf of) service 212 identifies the rights that the user of device 202 has for the associated software product. These rights are also referred to as the terms of the digital license, or permissions that the user has to use the associated software product. The digital license also typically includes the product key that was received from software protection client module 234. A variety of different rights can be identified in the digital license, such as a right to run the program, a right to install the program on a particular number of machines, a duration during which the program can be run (e.g., one month, one year, etc.), which features of the program are enabled and/or disabled, and so forth. The particular rights to be indicated in the digital license can be identified by service 212 (or another component or module) in a variety of different manners, such as based on a database or other record associating rights with product keys, based on other rules or algorithms, and so forth. The digital license is also typically digitally signed using a private key of a public/private key pair of service 212 or another component or module generating the digital license on behalf of service 212.

The digital license can be implemented in a variety of different manners. In one or more embodiments, the digital license is implemented in a markup language, such as the XrML (extensible rights Markup Language) language. Alternatively, the digital license can be implemented using other public and/or proprietary languages or techniques.

The digital license can be generated in a variety of different manners. In one or more embodiments, the digital license is generated in response to a request from software protection client module 234, the request including a product key. Additional conditions can also be placed on the generating of the digital license and/or the digital license can be generated in response to different requests. For example, a telephone call may be placed to a representative of a software product developer, and the representative can have the license generated in response to a user request to generate the digital license (e.g., the user providing to the representative over the phone the product key that the user has) and sent to software protection client module 234. By way of another example, an additional condition may indicate that biometric information such as a scan of the user's fingerprint (e.g., provided to software activation service 212 by software protection client module 234) be verified in order for the digital license to be generated. By way of yet another example, an additional condition may indicate that a digital certificate of the user (e.g., provided to software activation service 212 by software protection client module 234) be verified in order for the digital license to be generated.

Figure 3:
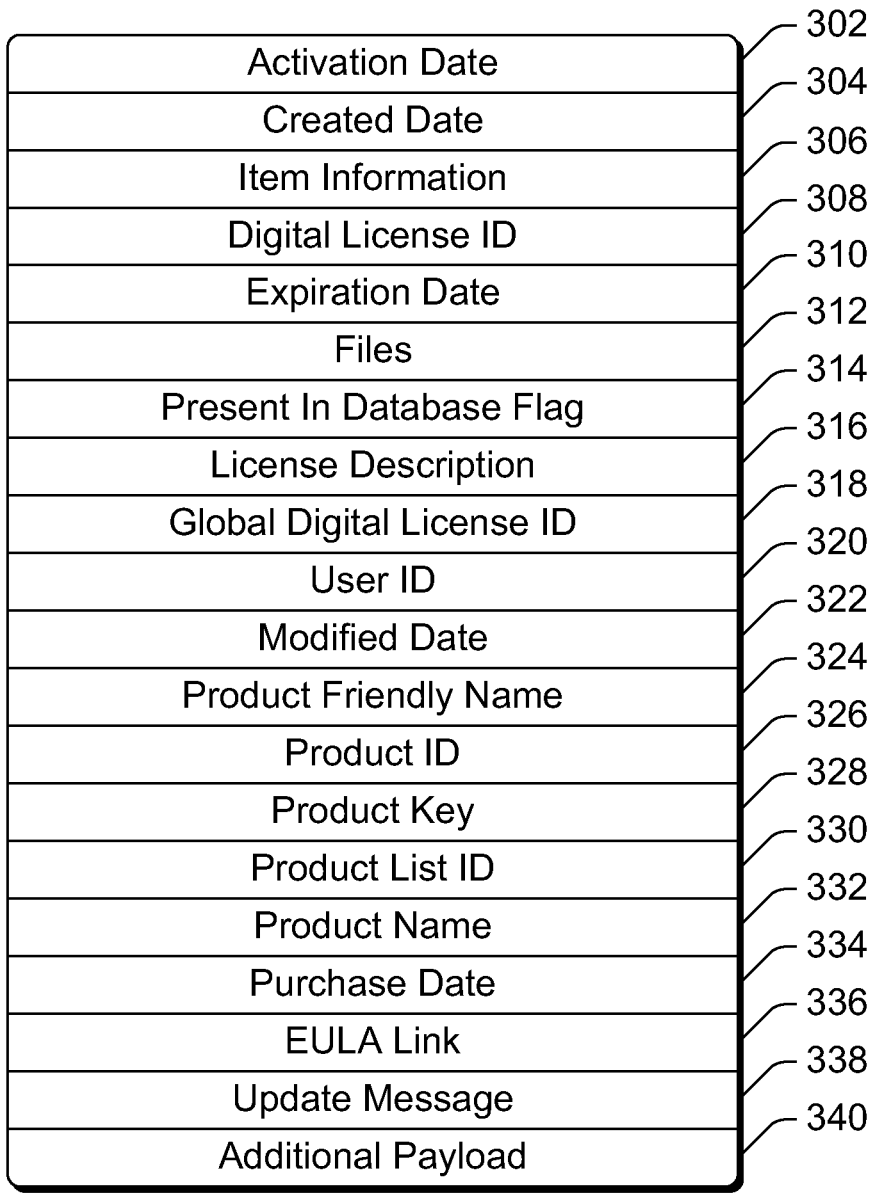
FIG. 3 illustrates an example digital license in accordance with one or more embodiments.

FIG. 3 illustrates an example digital license 300 in accordance with one or more embodiments. Digital license 300 includes multiple fields or portions 302-340 that include various information for license 300. It is to be appreciated that these fields illustrated in the example digital license 300 are merely examples, and that one or more fields illustrated in example license 300 can be removed from the digital license, one or more other fields can be added to the digital license, one or more fields can be combined, a field can be separated into multiple fields, and so forth. Additionally, it should be noted that digital license 300 can be encrypted, and/or individual ones of fields 302-340 can be encrypted (e.g., using the symmetric key and/or public key encryption discussed above). FIG. 3 is discussed with additional reference to components of FIG. 2.

Activation date field 302 stores data identifying the date (and optionally time) on which the product key corresponding to digital license 300 (e.g., included in product key field 328 discussed below) was most recently used to activate the software product. Activation date field 302 is set by software activation service 212 when the software product corresponding to digital license 300 is activated, or alternatively is set by another component or module that creates license 300.

Created date field 304 stores data identifying the date (and optionally time) on which digital license 300 was created. Created date field 304 is set by software activation service 212 when license 300 is created, or alternatively is set by another component or module that creates license 300.

Item information field 306 stores data describing digital license 300. This data can be, for example, an eXtensible Markup Language (XML) document describing various characteristics of the digital license such as a size of digital license 300, an indication of the fields present in digital license 300, and so forth. Item information field 306 is set by software activation service 212 when license 300 is created, or alternatively is set by another component or module that creates license 300.

Digital license ID field 308 stores an identifier of digital license 300, allowing license 300 to be distinguished from other digital licenses. In one or more embodiments, the identifier of license 300 is a locally unique identifier, allowing digital license 300 to be distinguished from other digital licenses within a smaller group (e.g., smaller than globally). Digital license ID field 308 is set by software activation service 212 when license 300 is created, or alternatively is set by another component or module that creates license 300.

Expiration date field 310 stores data identifying an expiration date (and optionally time) for digital license 300. The expiration date is used for time-based licenses in which the rights the user has to the software product (as further identified in digital license 300) have a limited duration. The duration of the rights the user has to the software product are identified in expiration date field 310. Expiration date field 310 is set by software activation service 212 or alternatively by another component or module that creates license 300, and can optionally be subsequently updated by license management service 204 and/or software protection client module 234.

Files field 312 stores data describing the digital license. This data includes, for example, a set of rights as discussed above that are given to a user with the digital license, such as an indication of how many copies of the software product can be run concurrently on different devices, an indication of particular features of the software product that are enabled, and so forth. This data can also include other information, such as an identifier of an original equipment manufacturer (OEM) that distributes a device with the software product associated with the product key (and thus the digital license), an identifier of a reseller of the software product associated with the product key (and thus the digital license), and so forth. Files field 312 is set by software activation service 212 or alternatively by another component or module that creates license 300, and can optionally be subsequently updated by license management service 204 and/or software protection client module 234.

Present in database flag field 314 is a flag that indicates whether license 300 is stored in license store 224. The present in database flag field 314 is set to a first value (e.g., "1") by license management service 204 to indicate that license 300 is stored in license store 224, and cleared or set to a second value (e.g., "0") by service 204 to indicate that license 300 is not stored in license store 224.

License description field 316 stores data describing license 300. This data can be, for example, a general description of the rights identified in files field 312, a name or other identifier of a person or entity that owns license 300, and so forth. License description field 316 is set by software activation service 212 when license 300 is created or alternatively by another component or module that creates license 300, and can optionally be subsequently updated by license management service 204 and/or software protection client module 234.

Global software license ID field 318 stores data that identifies license 300, allowing license 300 to be distinguished from other digital licenses. In one or more embodiments, the data identifying license 300 can be a globally unique ID (GUID). Global digital license ID field 318 distinguishes license 300 from other digital licenses on a global scale, whereas digital license ID field 308 allows license 300 to be distinguished from other digital licenses on a smaller scale. Global digital license ID field 318 is set by software activation service 212 when license 300 is created, or alternatively is set by another component or module that creates license 300.

User ID field 320 is an identifier of the current user of device 202 when digital license 300 is created. The user ID maintained in field 320 allows digital license 300 to be bound to a particular user, as discussed in more detail below. User ID field 320 can include, for example, the credentials received from user ID authentication service 214 discussed above or just the user ID from those credentials. User ID field 320 is set by license management service 204 or license client module 232 when digital license 300 is bound to the particular user. The user ID to which digital license 300 is bound can also be subsequently changed by service 204 and/or client module 232 as discussed in more detail below.

Modified date field 322 stores data identifying the date (and optionally time) on which digital license 300 was most recently modified. Modified date field 322 is set by license management service 212 and/or licensee client module 232 when license 300 is modified.

Product friendly name field 324 stores data identifying a user-friendly name of the software product associated with digital license 300. Product friendly name field 324 is set by software activation service 212 when license 300 is created, or alternatively is set by another component or module that creates license 300. Product friendly name field 324 can also optionally be subsequently changed by license management service 204 and/or license client module 232, such as in response to a user request to change the product friendly name.

Product ID field 326 is an identifier of the software product associated with digital license 300. In one or more embodiments, the data identifying the software product associated with license 300 can be a GUID. Product ID field 326 is set by software activation service 212 when license 300 is created, or alternatively is set by another component or module that creates license 300.

Product key field 328 is the received from software protection client module 232, and is the product key of the software product that is activated by software activation service 212. The product key is included in license 300 by software activation service 212 when the product is activated, or alternatively can be included by another component or module (e.g., by license client module 232).

Product list ID field 330 is a list of identifiers of software products. License 300 can optionally be associated with multiple different software products, and a list of those multiple different products is included in product list ID field 330. In one or more embodiments, the data identifying each of the software products associated with license 300 can be a GUID. Product list ID field 330 is set by software activation service 212 when license 300 is created, or alternatively is set by another component or module that creates license 300.

Product name field 332 stores data identifying an official name of the software product associated with digital license 300. Product name field 332 is set by software activation service 212 when license 300 is created, or alternatively is set by another component or module that creates license 300.

Purchase date field 334 stores data identifying the date (and optionally time) on which the software product associated with license 300 was purchased. The date on which the software product was purchased can be identified in different manners, such as being received from software purchase service 216, being input by a user of device 202, and so forth. Purchase date field 304 is set by software activation service 212 when license 300 is created, or alternatively is set by another component or module that creates license 300.

EULA (End User License Agreement) link field 336 is a link to an end user license agreement for license 300. The end user license agreement is a description generally written to be easily readable by a user of the rights to the software product that license 300 gives the user. This allows the user to review and know the rights that he or she has with license 300. EULA link field 336 is set by software activation service 212 when license 300 is created, or alternatively is set by another component or module that creates license 300.

Update message field 338 stores data that indicates success or failure after license management service 204 attempts to add license 300 to license store 224. If license 300 is successfully added to license store 224, then a message indicating success is stored in update message field 338 by service 204. If license 300 is not successfully added to license store 224, then a message indicating an error (and optionally a description of what the error is) is stored in update message field 338 by service 204.

Additional payload field 340 is an additional portion that can optionally be included in license 300 and used to store additional properties for license 300 that are not stored in fields 302-338 discussed above. These additional properties can be identified by, and stored in license 300, by one or more of various services or modules, such as by software activation service 212 when license 300 is created, by another component or module that creates license 300, by license management service 204, by license client module 232, and so forth.

Returning to FIG. 2, when a product is activated using a product key, software protection client module 234 receives the digital license for the associated software product. As discussed above, the product key for the activated product is included in the digital license. The activation of a software product is also referred to as the activation of that software product for that user ID. Software protection client module 234 can optionally store the digital license in local store 236.

Software protection client module 234 also communicates with license client module 232, requesting module 232 to send the digital license to license management service 204. In response to the request, license client module 232 passes the digital license and user credentials of the current user of device 202 to license management service 204. These user credentials are the credentials obtained from user ID authentication service 214 discussed above. If the user is not already logged into the online service, then license client module 232 prompts the user to login to the online service. The communication between license client module 232 and license management service 204 is typically performed in a secure manner, such as using encryption.

License management service 204 receives the digital license from license client module 232 and stores the received digital license in license store 224. License store 224 can be implemented using one or more of a variety of different storage media, such as magnetic disks, optical disks, RAM, Flash memory, and so forth. License store 224 can be implemented on the same device or devices as implement service 204, or alternatively service 204 and store 224 can be implemented on different devices.

The digital license received from license client module 232 is bound to the user ID of the current user of device 202. This binding can be binding the digital license to, for example, the credentials received from user ID authentication service 214 discussed above or to just the user ID from those credentials. This binding associates the digital license with the user ID, and can be performed in a variety of different manners. In one or more embodiments, the digital license itself includes the user ID as discussed above. The user ID can be added to the digital license by, for example, license client module 232 or license management service 204. This user ID in the digital license is the user ID to which the digital license is bound. In other embodiments, a binding can be performed in different manners. For example, license management service 204 can maintain a table or other record identifying particular digital licenses that are bound to particular user IDs. By way of another example, different folders or locations can be associated with particular user IDs and the digital licenses bound to a particular user ID stored in the folder or at the location associated with that particular user ID.

Additionally, in one or more embodiments, license management service 204 maintains a table or other record that associates user IDs with digital licenses. A separate table or record can be maintained for each software product, or alternatively the table or record can also include information associating the user IDs and digital licenses with the software products. Maintaining such tables or records allows license management service 204 to more quickly identify the digital license for a software product bound to a particular user ID when the digital license is requested.

It should be noted that situations can arise where the current user of device 202 does not yet have a user ID. In such situations, a user ID for the current user can be generated as part of the process of binding the digital license to the user ID of the current user. User ID authentication service 214 can, for example, be invoked (e.g., by license client module 232 or license management service 204) to assist in generating the user ID.

When a user of device 202, or alternatively another component or module, requests to run a software product, software protection client module 234 checks whether a digital license for that software product is available. Module 234 performs this check by communicating with local store 236 and/or license client module 232.

Module 234 requests module 232 to obtain a copy of the digital license from service 204. Module 232 sends a request for a copy of the digital license associated with the software product for which the request to run is received to license management service 204. Module 232 also sends the user credentials of the current user of device 202. These user credentials are the credentials obtained from user ID authentication service 214 discussed above. If the user is not already logged into the online service, then license client module 232 prompts the user to login to the online service.

In response to the request for the digital license, license management service 204 determines whether the user identified by the user credentials has a digital license for the requested software product. This determination can be performed, for example, by checking license store 224 or another record of digital licenses for a digital license with both a user ID that matches (e.g., is the same as) the user ID in the received user credentials, and a product ID that matches (e.g., is the same as) the product ID of the requested software product (as receiving a request from module 232).

Additionally, if the user identified by the user credentials has a digital license for the requested product, then license management service 204 determines whether the digital license can be returned to license client module 232 in accordance with the terms of the digital license. For example, service 204 checks to verify that the current date (and/or time) is not past an expiration date of the digital license. By way of another example, service 204 also checks to verify that a number of copies of the digital license that are outstanding at devices 202 does not exceed a threshold number (e.g., the threshold number being included as one of the terms of the digital license).

If the user identified by the user credentials has a digital license for the requested software product and the digital license can be returned to license client module 232 in accordance with the terms of the digital license, then service 204 returns that digital license to module 232. This digital license can be stored by module 232 in, for example, local store 236. Alternatively, the digital license may not be returned to module 232. Rather, an indication that the user has a digital license for the requested software product can be explicitly or inherently returned to module 232 (e.g., a message can be sent indicating that the user has a digital license, an image of the software product can be streamed to device 202 if the user has a digital license, and so forth). However, if the user identified by the user credentials does not have a digital license for the requested software product or if the digital license cannot be returned to license client module 232 in accordance with the terms of the digital license, then a failure indication is returned to module 232 and no digital license for the requested software product is returned to module 232.

Additionally, license management service 204 maintains a record or count of how many copies of the digital license bound to this user ID have been returned to license client modules 232. This count is incremented each time license management service 204 returns a digital license to license client module 232, and is decremented each time a license client module uninstalls or removes a digital license. Maintaining this count or record allows license management service 204 to readily identify whether a number of copies of the digital license that are outstanding at devices 202 exceeds a threshold number.

In one or more embodiments, module 234 checks local store 236 to determine if a digital license is available. This check can be performed before or after (or while) module 232 checks with service 204 for the digital license. Additionally, situations arise where access to service 204 is not available. In such situations, the digital license stored in local store 236 can be used at least temporarily to run the software product. The duration (e.g., number of days, number of accesses, etc.) of the digital license from local store 236 can be identified in different manners, such as a setting or configuration of module 232, from a right included in the digital license, and so forth. After this duration, module 234 no longer allows the digital license from local store 236 to be used to run the software product.

The duration of a digital license in local store 236 can also vary based on the business logic or business intelligence reflected in the rights in the digital license. In one or more embodiments, the duration of a digital license in local store 236 is the duration that the user with the user ID that is bound to the software is using device 202. When the user stops using device 202 can be detected in different manners, such as when the user requests to power down or log out of device 202, when the user requests to log out of the online service (for which the user obtained credentials from user ID authentication service 214), when the user requests to uninstall or delete the digital license from device 202, and so forth. The digital license can be deleted, uninstalled, or otherwise removed from device 202 when the user stops using device 202. Alternatively, the digital license can be inherently invalidated by having the duration of the digital license from local store 236 being set to end when the user stops using device 202.

Having the duration of the digital license be associated with the time the user is using device 202 allows the user to use the software products on multiple devices based on the digital licenses bound to his or her user ID regardless of where those multiple devices are located. For example, those devices can be the user's own devices in his or her home or office, or could be other user's devices such as devices in a friend's home, devices in a library or Internet café, and so forth.

If no digital license is available for the software product that is requested to be run, then software protection client module 234 does not allow the software product to be run. However, if a digital license is available, then module 234 allows the software product to be run in accordance with the terms and/or rights identified in the digital license. Module 234 is responsible for enforcing the terms and/or rights identified in the digital license.

In one or more embodiments, an identifier of the owner of the digital license for the software product is displayed or otherwise presented while the software product is run. This identifier can be obtained from the digital license. For example, the name of the owner can be displayed while the software product is run, allowing the user and anyone else viewing the device's display to see who the software product is licensed to. Such displays can be helpful, for example, in deterring piracy because users will know that if they are running a software product that is not licensed to them then other people seeing the display will be able to see that they did not purchase the software product that is running.

Additionally, it should be noted that software products can be run in a variety of different manners. In one or more embodiments, a software product is installed on device 202 and run if a digital license for the software product is available. In other embodiments, images of software products can be stored on one or more remote services, and those images can be streamed to device 202 and run if a digital license for the software product is available. In such embodiments, software products can be obtained on an as-needed basis.

License management service 204 can also communicate with one or more other services to obtain additional information corresponding to a particular digital license. Examples of such services include relationship service 218, product validation service 220, and product registration service 222.

Relationship service 218 maintains records that relate various entities or parties associated with a product key to a digital license. These different parties can include, for example, distributors of the software product, resellers of the software product, manufacturers of the software product, and so forth. License management service 204 can obtain these associations from service 218 and maintain them with the digital licenses in license store 224. Identifications of these associations can be included in the digital licenses in license store 224, or alternatively a separate record of these associations can be maintained.

As an example, a particular product key can be generated by a particular manufacturer of a software product and given to an original equipment manufacturer (OEM) which in turn distributes a device along with the software product to a reseller. An association of this product key to this manufacturer, this OEM, and this reseller can be maintained by relationship service 218. Relationship service 218 can be informed of this association in a variety of different manners, such as by the manufacturer, OEM, and/or reseller. When a digital license having this product key is received by license management service 204, service 204 can obtain the identity of the manufacturer, the OEM, and the reseller from relationship service 218 and maintain these identities in license store 224 as being associated with the received digital license.

Product validation service 220 maintains a record for each digital license of the history of that digital license based on the product key associated with that digital license. This history can include, for example, dates and/or times when the product key for the digital license was used to activate a software product, whether and when the digital license was revoked, whether and when the digital license was re-enabled, and so forth. This history can also include an indication of whether the product key was revoked and reactivated, when the product key was revoked and reactivated, and so forth. Product validation service 220 obtains this history from other services, such as license management service 204, software activation service 212, and so forth. License management service 204 can obtain this history from product validation service 220 and maintain the history with the digital licenses in license store 224. These histories can be included in the digital licenses in license store 224, or alternatively a separate record of these histories can be maintained.

Product registration service 222 maintains a record for each digital license of the product registration information for that digital license based on the product key associated with that digital license. This product registration information can include various information collected from a user of device 202 when the user registers the associated software product. For example, this information can include an age of the user, a geographic location where the user lives or works, hobbies and/or interests of the user, and/or any other information that the user chooses to divulge. License management service 204 can obtain this product registration information from product registration service 222 and maintain the product registration information with the digital licenses in license store 224. This product registration information can be included in the digital licenses in license store 224, or alternatively a separate record of this product registration information can be maintained.

In one or more embodiments, the user ID of a user is bound to a digital license only after receiving user consent to do so. This user consent can be an opt-in consent, where the user takes an affirmative action to request that the user ID be bound to the digital license. Alternatively, this user consent can be an opt-out consent, where the user takes an affirmative action to request that the user ID not be bound to the digital license. If the user does not choose to opt out of this binding, then it is an implied consent by the user to perform the binding.

Furthermore, it should be noted that the binding of user IDs to digital licenses can allow license management service 204 to distinguish between different users, but need not include any personal information identifying particular users. For example, a user may login to the online service via user ID authentication service 214 with a particular user ID, but no association between that user ID and the actual person need be maintained. Accordingly, digital licenses can be bound to that user ID while at the same time service 204 has no knowledge of who that user actually is.

Figure 4:
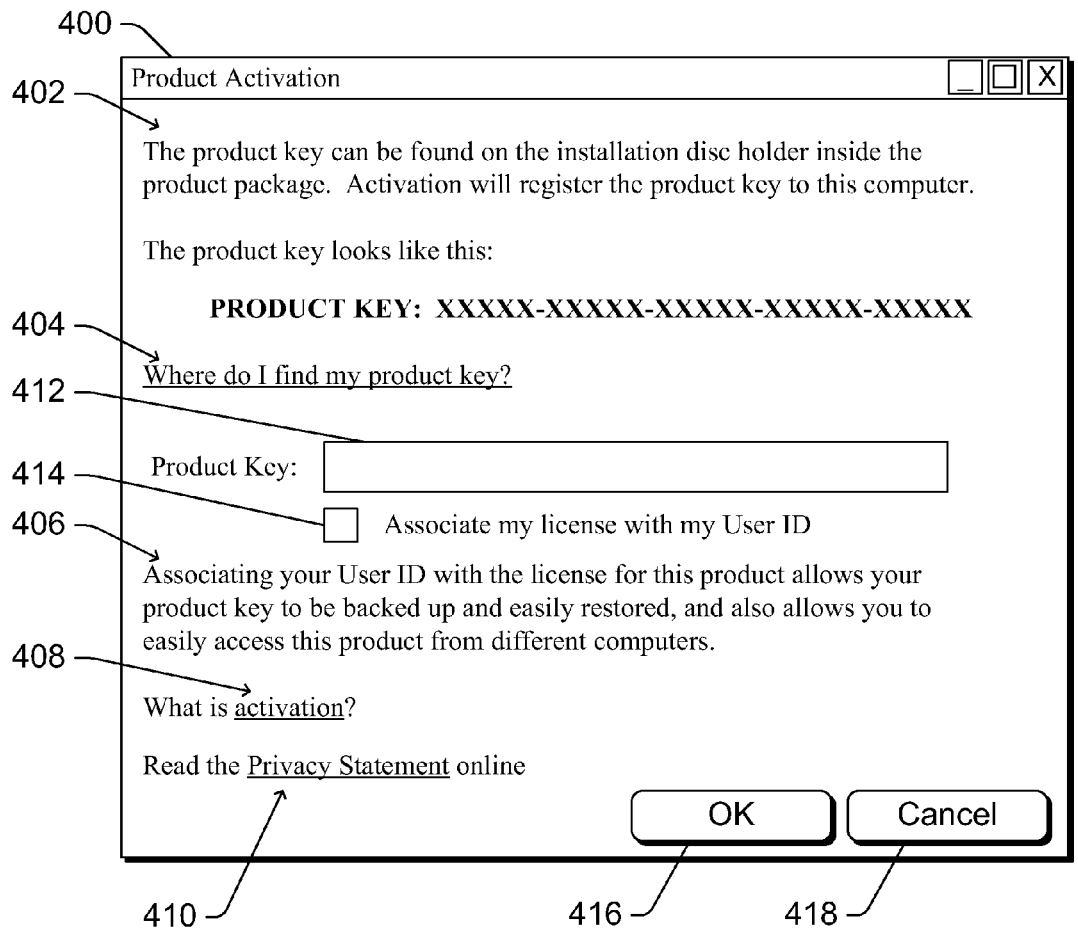
FIG. 4 illustrates an example product activation window that can be displayed to a user in accordance with one or more embodiments to allow the user to select whether his or her user ID is to be bound to the digital license.

FIG. 4 illustrates an example product activation window 400 that can be displayed to a user in accordance with one or more embodiments to allow the user to select whether his or her user ID is to be bound to the digital license. The example window 400 is displayed when the user is activating his or her software product. It is to be appreciated that different user interfaces can be alternatively displayed, and that user interfaces can alternatively be displayed at different times. For example, a user interface allowing the user to opt-in or opt-out of binding his or her user ID to a digital license can be displayed in response to a user request to change the binding to a different user ID, in response to a user request to add a digital license to license management service 204 of FIG. 2, and so forth. Additionally, in the example of FIG. 4, the product key has a particular format (five 5-character strings, also referred to as a 5×5 key). It is to be appreciated that this particular format for a product key is an example, and that the product key can take different forms as discussed above.

Product activation window 400 includes a description 402 explaining how to activate the software product and register the product key for the software product. Description 402 also includes an example of what a product key looks like. A link 404 to a more detailed description of how to the find the product key is also displayed. A description 406 explaining to the user why the user ID is being associated with (e.g., bound to) the license for this software product is also displayed. Both a link 408 to a more detailed description of what activation is and a link 410 to a privacy statement are also displayed. If the user selects link 410, a privacy statement is displayed, explaining to the user how the user's information is kept confidential.

A text entry field 412 is also displayed in window 400, into which the user can enter the product key for the software product. Additionally, the user is able to select a check box 414 to opt-in to the associating or binding of the user's user ID to the license. The user is also able to leave check box 414 unselected to opt-out of the associating or binding of the user's user ID to the license. Once the product key is entered and check box 414 is selected if desired, the user can select an "OK" button 416 to have the product activated. The user can also select a "Cancel" button 418 to terminate the product activation process. If the user selects check box 414 then the digital license received from activating the software product is associated with the user ID of the user. If the user does not select check box 414, then the digital license received from activating the software product is stored on the device but is not associated with the user ID of the user.

It is to be appreciated that check boxes and "OK" and "Cancel" buttons are only examples of user interfaces that can be presented to a user to opt-in or opt-out of the binding, and that a variety of other conventional user interface techniques can alternatively be used. It is also to be appreciated that various parts of product activation window 400 can be excluded from window 400, such as link 408, link 410, link 404, description 402, and so forth.

Returning to FIG. 2, license management service 204 can make a variety of different enhanced functionality available to users of device 202. Examples of this functionality include adding a new digital license to license store 224, restoring a product key from license store 224 to device 202, automatically renewing digital licenses in license store 224 on behalf of the user, deleting a digital license from license store 224, retrieving details regarding a digital license in license store 224 (e.g., information from the digital license or associated with the digital license can be retrieved), uninstalling a product key from device 202 (e.g., so that it can be used on another device), and so forth.

Additionally, license management service 204 can also make available to users of device 202 the ability to transfer a digital license from one user to another. This allows, for example, a user to gift or sell his or her digital license to another user. To transfer a digital license, the user submits a request to license management service 204 (e.g., via license client module 232) to transfer the digital license. Service 204 then obtains the user ID of the recipient of the transferred digital license and saves the digital license as being bound to the user ID of the recipient of the transferred digital license. Service 204 can obtain the user ID in different manners. In one or more embodiments, the user submitting the request to transfer the digital license also submits the user ID of the recipient of the transferred digital license. In other embodiments, in response to the request to transfer the digital license service 204 notifies software activation service 212 that the software product associated with the product key in the digital license has been deactivated. A record of the deactivation can also be stored in product validation service 220. Accordingly, the recipient of the transferred digital license can enter the product key into his or her device and have the software product activated using the product key as discussed above.

In one or more embodiments, license management service 204 also allows the user to manage digital licenses associated with his or her user ID. Various information regarding the digital licenses can be provided to the user, such as activation history, registration information that the user provided, the expiration date, and so forth. Additionally, various information regarding the digital licenses can be modified by the user, such as allowing the user to request that service 240 automatically renew the digital license, allowing the user to input a user-friendly name describing the license, and so forth.

License management service 204 can also monitor digital licenses in license store 224 and revoke a digital license when service 204 identifies noncompliance with the terms of the digital license. The revocation of a digital license can be performed in a variety of different manners, such as storing data in the digital license indicating that the digital license has been revoked, maintaining a separate record or listing of digital licenses that have been revoked, removing the digital license from license store 224, and so forth. License management service 204 can determine noncompliance with the terms of the digital license in a variety of different manners and relying on various business logic or business intelligence. For example, the digital license can include an expiration date, and service 204 can determine noncompliance with the terms of the digital license when this expiration date passes. By way of another example, the digital license can include an indication of a number of copies of the license that can be outstanding at devices at any one time. If this number of copies is exceeded by a threshold number, service 204 can determine noncompliance with the terms of the digital license (e.g., and assume that the user ID to which the digital license is bound has been compromised).

Furthermore, in one or more embodiments a user of device 202 can request that a digital license be uninstalled or removed from device 202. This request can be an explicit request, such as selection of a displayed link or menu item indicating that the digital license is to be uninstalled or removed from device 202. This request can also be an implicit request, such as being inherent in the user logging out of the online service (e.g., via user ID authentication service 214). In response to such a request, license client module 232 deletes or otherwise invalidates any digital licenses bound to that user ID that are stored in local store 236. Module 232 also sends an uninstall request to license management service 204, notifying service 204 that the license has been uninstalled from device 202. This allows service 204 to update its count or record of the number of copies of the digital license that are outstanding.

In addition to managing digital licenses and making various functionality regarding the digital licenses available to users, license management service 204 also allows various offers for additional products or services to be displayed or otherwise presented to users. Oftentimes users are unaware of additional or upgraded products that are available, as well as the services that are provided with the additional or upgraded products. When the user accesses service 204 (directly or via license client module 234), service 204 is aware of the digital licenses that are bound to that user's user ID. Service 204 can access a list or other record of software products or services and identify, based on the digital licenses bound to the user's user ID, one or more additional or upgraded products that are available to the user. These various products, as well as an option to purchase the products, can be presented to the user.

For example, assume that the user ID for a particular user is bound to a digital license for an operating system on the user's device. If the user re-installs the operating system on the device, or requests information regarding the digital license associated with the operating system, license management service 204 can check to see if an upgraded version of the operating system is available for the user to purchase. If such an upgraded version of the operating system is available, service 204 can display to the user an indication of the upgraded version, a description of the added benefits and/or services that the user will get with the upgraded version, as well as an option to purchase the upgraded version. The user can then select to purchase the upgraded version, obtaining the additional benefits and/or services of the upgraded version. The purchasing of the upgraded version can be managed by service 204, or alternatively another service (e.g., software purchase service 216). Additionally, this upgraded version may have a new product key that is used to activate the upgraded version activated as discussed above, or alternatively the product key from the previous version of the product that has already been activated can be used for the digital license for the upgraded version of the product.

Figure 5:
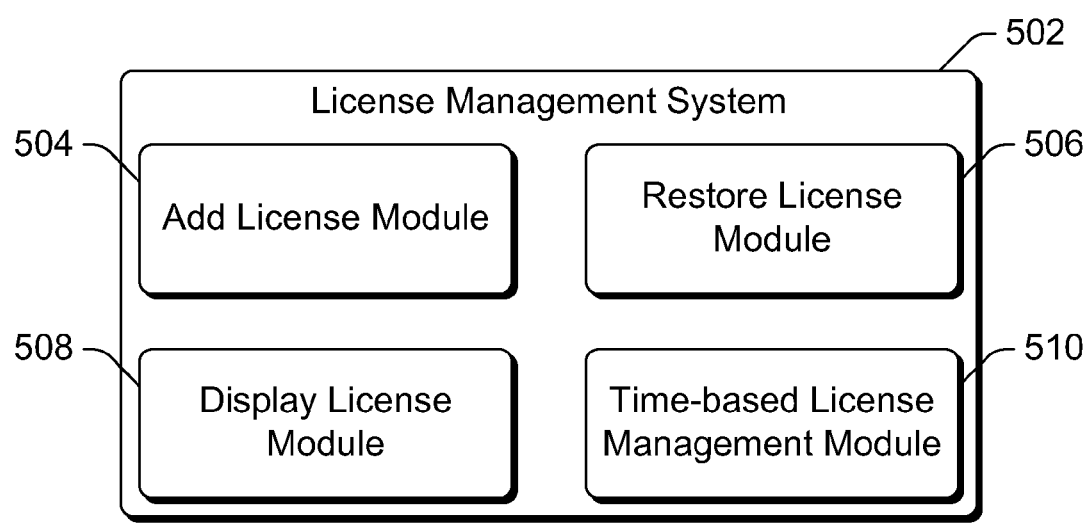
FIG. 5 illustrates an example license management system in accordance with one or more embodiments.

FIG. 5 illustrates an example license management system 502 in accordance with one or more embodiments. In one or more embodiments, license management system 502 is a license management system 204 of FIG. 2 or a license service 104 of FIG. 1. In other embodiments, license management system 502 is implemented at least in part in other components, modules, or services. For example, at least a portion of license management system 502 can be implemented in device 202, such as part of license client module 232. In such embodiments, system 502 can provide a user interface and receive requests from a user of device 202, and communicate with license management service 204 to carry out the requests. Such a user interface can be displayed or otherwise presented to the user in a variety of different manners, such as via an operating system control panel option, via a system or product properties tab or window, and so forth.

License management service 502 includes an add license module 504, a restore license module 506, a display license module 508, and a time-based license management module 510. Although illustrated as separate modules 504, 506, 508, and 510, it is to be appreciated that the functionality of one or more of modules 504-510 can be combined together. Additionally, it is to be appreciated that the functionality of each of one or more of modules 504-510 can be separated into different modules.

The user of a device (e.g., device 202 of FIG. 2) can input a request to license management system 502 to manage his or her licenses in a variety of different manners. For example, the user can select a link to manage licenses, can select a menu item or button to manage licenses, can input a text command to manage licenses, and so forth. Links or other user interface mechanisms can be presented to the user by a software product running on the device, when the user starts or logs into the device, when the user logs in to an online service (e.g., and is authenticated by user ID authentication service 214 of FIG. 2), and so forth. Regardless of the manner in which a request to manage a user's licenses is made, in response to the request license management system 502 displays or otherwise presents a user interface to the user via the device that allows the user to input various requests and manage the digital licenses bound to his or her user ID.

License management system 502 allows the user to manage digital licenses bound to his or her user ID. Accordingly, the user ID of the user is provided to system 502. The user ID provided to system 502 is the user credentials for the user (e.g., obtained from user ID authentication service 214 of FIG. 2) as discussed above.

Add license module 504 manages the addition of digital licenses bound to a user ID of the user to a license store (e.g., store 224 of FIG. 2). In one or more embodiments, when a software product is activated, a digital license can be bound to a user ID and communicated to license management system 502. Add license module 504 allows the user to input requests to have digital licenses bound to his or her user ID at other times. Module 504 receives as inputs both user credentials for the user (providing module 504 with the user ID of the user) and the product key to be added. The product key can be provided to module 504 in different manners, such as manually entered by the user, copied (or cut) from another source and pasted by the user, by the user identifying a source for the license (e.g., another service), and so forth.

If the product key that the user identifies has already been used to activate the software product, then a digital license corresponding to that product key is already on the user's device. Accordingly, module 504 communicates with a license client module (e.g., module 232 of FIG. 2) of the device to retrieve the digital license from a local store of the device. If the digital license has not already been bound to the user ID of the user, then module 504 binds the digital license to the user ID of the user.

If the product key that the user identifies has not been used to activate the software product, then a software activation service (e.g., service 212 of FIG. 2) is accessed to activate the software product. License management system 502 can access the software activation service to activate the software product, or alternatively another component or module can access the software activation service to activate the software product.

Add license module 504 receives the digital license from the device being used by the user, or alternatively from a software activation service. If not already bound to the user ID of the user (e.g., by having the user ID included in the digital license), module 504 binds the digital license to the user ID of the user. Module 504 also stores the digital license in the license store (e.g., store 224 of FIG. 2).

Add license module 504 can also optionally allow a user to provide additional information regarding a digital license and have that additional information included in the digital license. For example, the user can provide a description of the license (e.g., a friendly name) and/or software product that he or she more easily understands. Such a friendly name can be stored, for example, in product friendly name field 324 of FIG. 3.

Restore license module 506 allows a user to input requests to recover or restore digital licenses that are bound to his or her user ID. Situations can arise where the user desires to recover his or her digital licenses. For example, the user may have a new machine that he or she desires to transfer his or her software products to, the user may have reinstalled the operating system (or installed a new operating system) on his or her device and desires to reinstall his or her software products, the user may have changed the hardware in his or her machine and desires to reinstall his or her software products, and so forth.

The user interface presented by license management system 502 allows a user to input a request to restore or recover his or her digital licenses. In response to such a request, restore license module 506 identifies the licenses from the license store (e.g., store 224 of FIG. 2) that are bound to the user ID of the user. A list of these digital licenses is displayed or otherwise presented to the user. The digital license list can be presented in different manners, such as by a listing of product name and friendly name (if any) provided by the user, and/or listing other information from the digital license.

The user can then select from digital licenses in the list presented by module 506. Module 506 then communicates the selected digital licenses to the device being used by the user (assuming the rights in the digital licenses permit the user to use them on the device). Once the digital licenses to be restored or recovered are selected, the process for returning the selected digital licenses to the device is the same as discussed elsewhere herein (e.g., with reference to process 800 of FIG. 8 discussed below).

Display license module 508 displays or otherwise presents license detail information to the user. Module 508 can present a list of digital licenses bound to the user ID of the user, and the user can select one or more licenses from that list. The digital license list can be presented in different manners, such as by a listing of product name and friendly name (if any) provided by the user, and/or listing other information from the digital license.

Once selected, additional information from the digital license is also displayed. All of the information from the digital license can be displayed to the user (e.g., the data from all the fields of digital license 300 of FIG. 3), or alternatively a subset of the information from the digital license can be displayed.

Display license module 508 also allows the user to uninstall a license from the device he or she is using. The user identifies (e.g., selects from the displayed list) the license he or she desires to uninstall, and module 508 sends an indication to a license client module (e.g., module 232 of FIG. 2) of the device to delete or remove the digital license from the local store of the device. In one or more embodiments, the user requests to uninstall a license from one device he or she is using so that he or she can recover or restore that software license on another device.

Display license module 508 also allows the user to input requests to delete a binding of a license from to his or her user ID. The user identifies (e.g., selects from the displayed list) the license for which he or she desires to delete the binding, and module 508 removes the digital license from the license store (e.g., store 224 of FIG. 2). As part of the deletion process, module 508 can also send the digital license to a license client module (e.g., module 232 of FIG. 2) of the device for local storage on the device as the digital license will no longer be stored and managed by license management service 502.

Time-based license management module 510 allows a user to input requests to manage time-based licenses. Module 508 can present a list of digital licenses bound to the user ID of the user, and the user can select one or more licenses from that list. The digital license list can be presented in different manners, such as by a listing of product name and friendly name (if any) provided by the user, and/or listing other information from the digital license.

The user identifies (e.g., selects from the displayed list) a license, and can indicate a desired amount of time for that license. For example, the user can indicate a request to activate the license for a particular duration, such as an hour, a day, a month, etc. The user can also optionally input account information (e.g., a credit card number) to pay for the desired duration if such information is not already available to license management system 502. Once requested, module 508 can send the digital license with the indicated duration to a license client module (e.g., module 232 of FIG. 2) of the device for local storage on the device. Alternatively, module 508 can send an indication to the license client module to update the expiration date field of the digital license already stored on the device.

Time-based license management module 510 can also optionally manage automatic updating and payment of licenses as discussed in more detail below. The user identifies (e.g., selects from the displayed list) a license that he or she desires to have automatically renewed, and authorizes automatic billing to an account (e.g., a credit card or other account number) so that the license is automatically renewed, as discussed in more detail below.

Figure 6:
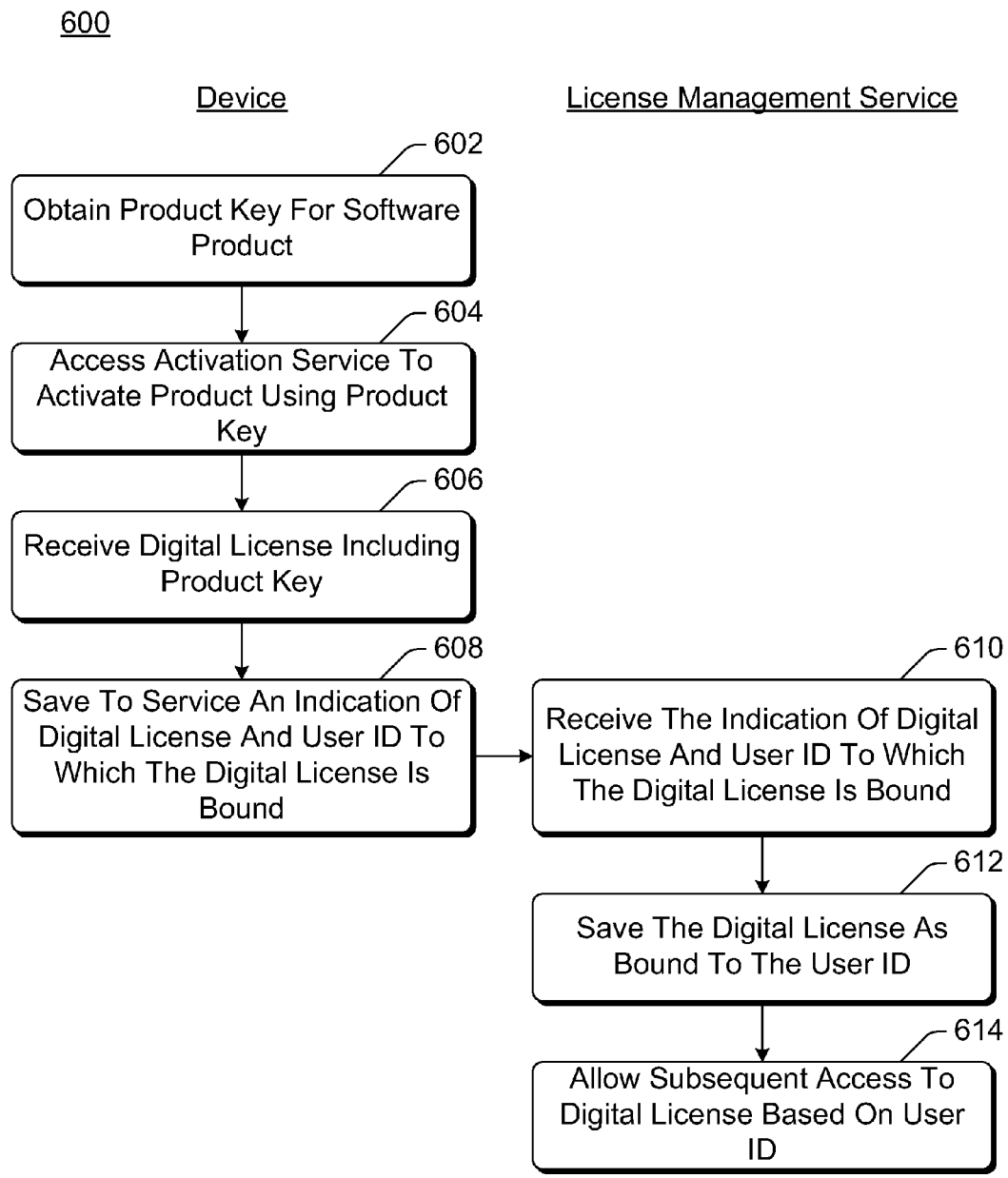
FIG. 6 is a flowchart illustrating an example process for obtaining and storing a digital license in accordance with one or more embodiments.

FIG. 6 is a flowchart illustrating an example process 600 for obtaining and storing a digital license in accordance with one or more embodiments. Process 600 can be implemented in software, firmware, hardware, or combinations thereof. Acts of process 600 illustrated on the left-hand side of FIG. 6 are carried out by a device, such as device 202 of FIG. 2. Acts of process 600 illustrated on the right-hand side of FIG. 6 are carried out by a license management service, such as license management service 204 of FIG. 2 or license management system 502 of FIG. 5. Process 600 is an example process for obtaining and storing a digital license; additional discussions of obtaining and storing a digital license are included herein with reference to different figures.

In process 600, a product key for a software product is obtained (act 602). This product key can be obtained in a variety of different manners, such as being received from a remote service (e.g., software purchase service 216 of FIG. 2), being received from a user input, and so forth.

An activation service is accessed to activate the software product using the product key (act 604). As part of the activation process, the product key obtained in act 602 is communicated to the activation service.

Once activated, a digital license including the product key is received (act 606). This digital license is typically received from the activation service, although can alternatively be received from another service on behalf of or at the request of the activation service.

An indication of the digital license and the user ID to which the digital license is bound is saved to the license management service (act 608). This remote service is, for example, license management service 204 of FIG. 2 or license management system 502 of FIG. 5. The indication of the digital license and the user ID are received by the license management service (act 610), and the digital license is saved in a license store as bound to the user ID (act 612). The user ID can be bound to the digital license before the digital license is sent to the license management service, such as by adding the user ID to the digital license before sending the digital license to the license management service. Alternatively, the user ID can be bound to the digital license by the license management service saving the user ID in the digital license or maintaining a separate record associating the user ID with the digital license.

The license management service then allows subsequent access to the digital license based on the user ID (act 614). The user having the user ID can retrieve the digital license from the license management service and use the digital license on a device (which may or may not be the same device from which the software product was activated).

Figure 7:
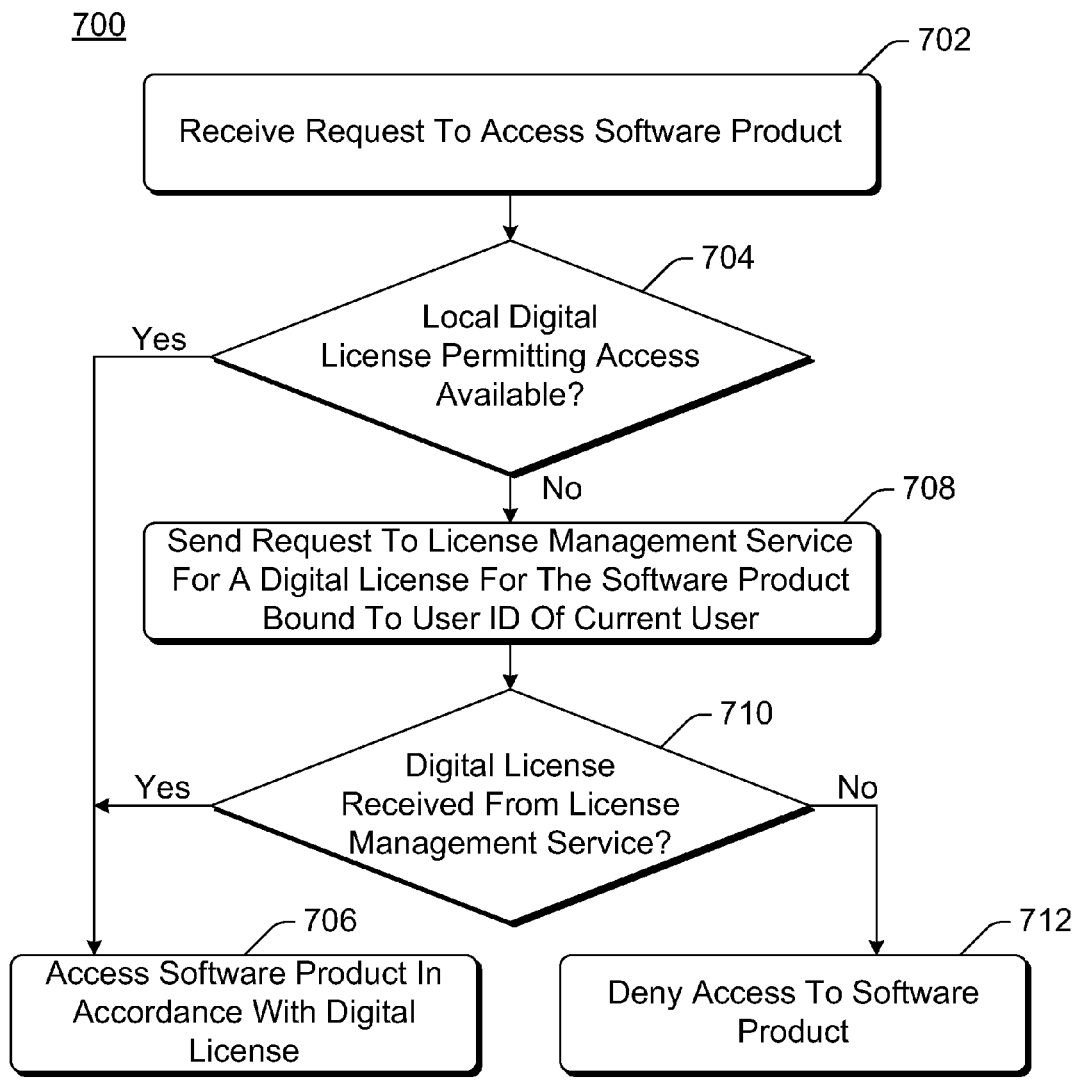
FIG. 7 is a flowchart illustrating an example process for running a software product in accordance with one or more embodiments.

FIG. 7 is a flowchart illustrating an example process 700 for running a software product in accordance with one or more embodiments. Process 700 is carried out by one or more devices, such as a device 202 of FIG. 2, and can be implemented in software, firmware, hardware, or combinations thereof. Process 700 is an example process for running a software product; additional discussions of running a software product are included herein with reference to different figures.

In process 700, a request to access a software product is received (act 702). This request can be a user request, or alternatively can be received from another module or component.

In response to the request, a check is made as to whether a digital license permitting access to the software product is available locally (act 704). Such a locally available digital license is typically stored in a local store of the device implementing process 700. A digital license associated with the software product permits access to the software product if the digital license has not expired (e.g., the current date and/or time is not past the expiration date and/or time of the digital license), and any other terms in the digital license are satisfied.

If a local digital license permitting access to the software product is available, then the software product is accessed in accordance with the digital license (act 706). This access includes running the program, and can optionally involve various restrictions on running the program based on the terms in the digital license.

Returning to act 704, if a local digital license permitting access to the software product is not available, then a request for a digital license is sent to the license management service (act 708), such as service 204 of FIG. 2 or license management system 502 of FIG. 5. This request is a request for a digital license for the software product that is bound to the user ID of the current user of the device implementing process 700. This user ID is verified by an online service (such as the Microsoft Windows Live™ network of internet services) as discussed above.

A check is then made as to whether the requested digital license is received from the license management service (act 710). The requested digital license may not be returned by the license management service for a variety of different reasons, such as the digital license being expired, no digital license for the software product being bound to the user ID, and so forth. If the requested digital license is received from the license management service, then the software product is accessed in accordance with the digital license (act 706). Alternatively, rather than receiving the digital license, an indication that the user has a digital license for the software product can be received as discussed above. However, if the requested digital license is not received from the license management service, then access to the software product is denied (act 712).

Figure 8:
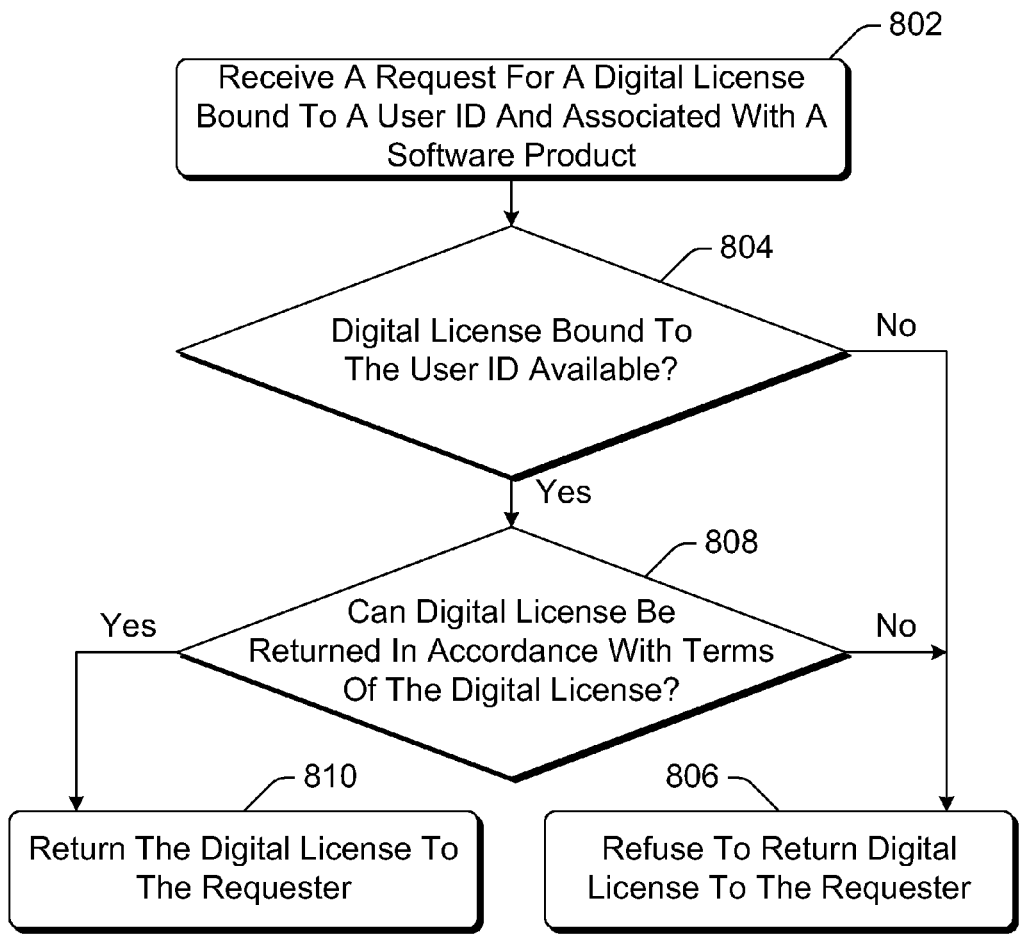
FIG. 8 is a flowchart illustrating an example process for returning a requested digital license in accordance with one or more embodiments.

FIG. 8 is a flowchart illustrating an example process 800 for returning a requested digital license in accordance with one or more embodiments. Process 800 is carried out by one or more services, such as a license management service 204 of FIG. 2 or license management system 502 of FIG. 5, and can be implemented in software, firmware, hardware, or combinations thereof. Process 800 is an example process for returning a requested digital license; additional discussions of returning a requested digital license are included herein with reference to different figures.

In process 800, a request for a digital license bound to a user ID and associated with a software product is received (act 802). This request is received from a device, such as device 202 of FIG. 2.

A check is then made as to whether a digital license for the software product bound to the user ID is available (act 804). This checking can take a variety of different forms based on the manner in which the binding of the digital license to the user ID is maintained. For example, this checking can include checking the user IDs in the digital licenses the service maintains in a license store, checking a table or other record associating user IDs with digital licenses, and so forth. The digital license being available refers to the digital license existing in the license store.

If no digital license for the software product that is bound to the user ID is available, then the service implementing process 800 refuses to return a digital license to the requester (act 806).

However, if a digital license for the software product that is bound to the user ID is available, then a check is made as to whether the digital license can be returned in accordance with the terms of the digital license (act 808). Situations can arise where although a digital license for the software product is bound to the user ID, the terms of the digital license indicate that the digital license is no longer valid. For example, the digital license can be expired, can have been revoked, can already have been returned to too many other requesters (e.g., there are greater than a threshold number of copies of the digital license outstanding), and so forth.

If the terms of the digital license indicate that the digital license can be returned to the requester, then the service implementing process 800 returns the digital license to the requester (act 810). Alternatively, rather than returning the digital license, an indication that the user with the user ID has a digital license for the software product can be returned as discussed above. However, if the terms of the digital license indicate that the digital license cannot be returned to the requester, then the service implementing process 800 refuses to return a digital license to the requester (act 806).

One way in which the digital licenses bound to user IDs discussed herein can be used is to allow different parties to be recognized and/or receive revenue for sales of additional products or services that stem from those digital licenses. Various parties can be identified in the digital licenses as discussed above, such as an OEM, a reseller, and so forth. Offers regarding additional products or services available to the user can be presented based on these various parties. For example, offers to upgrade to new versions of the software product or to different versions of the software product with additional functionality can be presented to the user. By way of another example, offers to purchase at a discounted price a peripheral device that can be used with the software product can be presented to the user. These offers can be presented to the user in a variety of different manners and at a variety of different times, such as when the user logs in to the online service (via user ID authentication service 214 of FIG. 2), when the user is reviewing information regarding his or her digital license via license management service 204 of FIG. 2 or license management system 502 of FIG. 5, when a digital license is being retrieved from service 204 or system 502, and so forth.

As a specific example, assume that a user purchases a software product from retailer XYZ Corp. When the user is managing his or her licenses, an offer can be presented to the user to purchase additional devices at a discount. For example, the user can be presented with an offer that "You purchased your new software from XYZ Corp last week—this week you are eligible for $100 off digital cameras and printers to use with your new software."

Given the various parties identified in the digital licenses, when an offer for a product or service is presented to a user and the user accepts the offer, one or more of the parties identified in the digital license can be recognized with the acceptance of the offer. This acceptance is typically an additional sale of a product or service. The user can accept such an offer in different manners, such as by selecting a link to an online store to purchase the product or service, printing out a coupon (e.g., with an identifier of the digital license on it) and taking the coupon to a local software store (e.g., a brick and mortar business), and so forth. Accordingly, the users can be presented with offers for the sale of additional services or products associated with the software products for which they have digital licenses, and the various parties identified in the digital licenses have the ability to receive additional income and/or recognition for those sales. This can also be viewed as the data regarding the various parties identified in the digital licenses being migrated to other services or devices to receive this additional income and/or recognition.

As a specific example, assume that a user purchases a new computer with an installed software product from retailer ABC Corp. When the user is managing his or her licenses, an offer can be presented to the user to purchase additional devices at a discount. For example, the user can be presented with an offer that "You purchased your new computer from ABC Corp—this week you are eligible for 50% off printers from XYZ Corp to use with your new computer." If the user accepts this offer and purchases a printer from XYZ Corp, then ABC Corp (identified as the OEM in the digital license) can be recognized as being at least partially responsible for the sale of the printer. ABC Corp can then receive additional income and/or other recognition from XYZ Corp for this sale of the printer.

Figure 9:
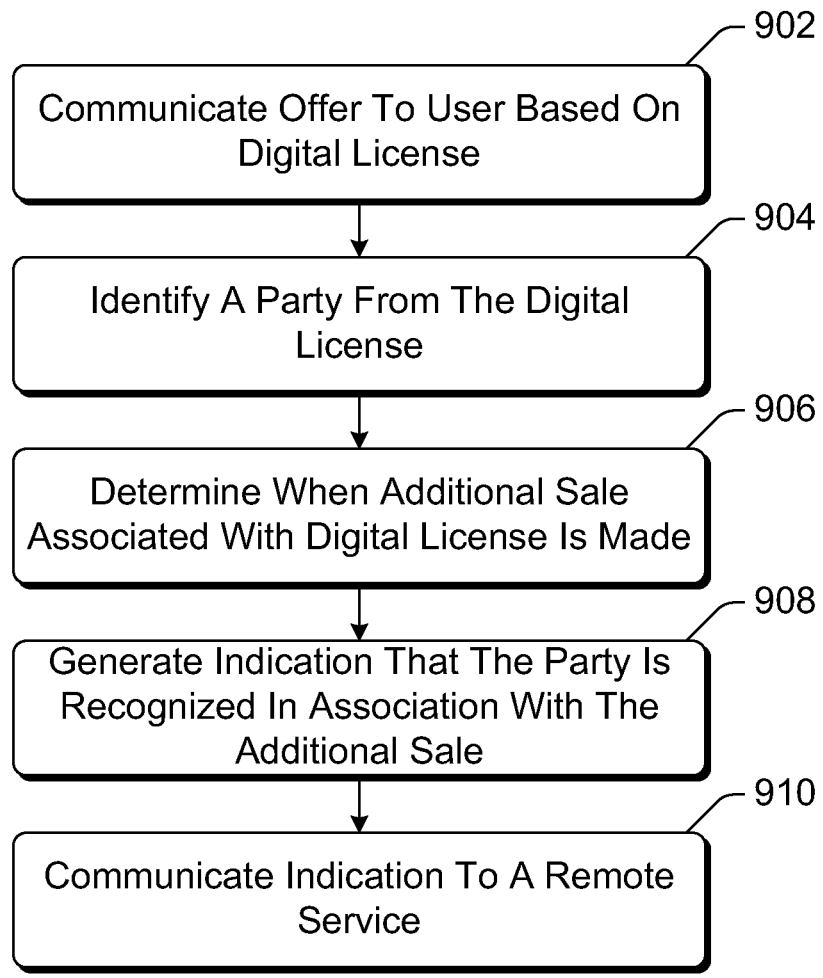
FIG. 9 is a flowchart illustrating an example process for using digital licenses in accordance with one or more embodiments.

FIG. 9 is a flowchart illustrating an example process 900 for using digital licenses in accordance with one or more embodiments. Process 900 is carried out by one or more services, such as a license management service 204 of FIG. 2 or license management system 502 of FIG. 5, and can be implemented in software, firmware, hardware, or combinations thereof. Process 900 is an example process for using digital licenses; additional discussions of using digital licenses are included herein with reference to different figures.

In process 900, an offer for a product and/or service is communicated to a user based on the digital license (act 902). The offer can be communicated in a variety of different manners, such as being displayed to the user while he or she is managing his or her digital licenses, when a digital license is retrieved from a license management service, in an email message, and so forth.

A party is identified from the digital license (act 904). A variety of different parties in the digital license can be identified, such as a manufacturer of the software product, a reseller of the software product, an OEM that distributes a device with the software product, and so forth.

A determination is made of when an additional sale associated with the digital license is made (act 906). This determination is made, for example, when the offer communicated to the user in act 902 is accepted by the user and the offered product or service is purchased by the user.

An indication that the party is recognized in association with the additional sale is generated (act 908). This indication is optionally communicated to a remote service (act 910). The manner in which this indication is used can vary. For example, the indication can be used to credit the party with the additional sale, and transfer at least a portion of the proceeds of the additional sale to the party.

Returning to FIG. 2, license management service 204 (or license management system 502 of FIG. 5) can also carry out a variety of different functions based on digital licenses in license store 224. In one or more embodiments, license management service 204 monitors time-based licenses that are stored in license store 224. Service 204 can be configured to automatically update the time-based licenses when they expire. This automatic updating can be done, for example, in response to a user request to automatically update the license. Service 204 can be configured with payment information (e.g., a credit card number), or alternatively can communicate with another service to obtain payment for updating the license. Once payment to update the license is received, service 204 can update the expiration date and/or time of the license to reflect a new (later) expiration date and/or time.

For example, a user of device 202 can request and pay a fee for use of a software product for one month. The expiration date in the digital license associated with the software product indicates an expiration in one month. The user can also request that service 204 automatically update the license. In response to such requests, when the expiration date of the digital license is reached, service 204 automatically charges the user for an additional one month of usage. Service 204 also updates the expiration date in the digital license to reflect that the expiration date is another month away.

Figure 10:
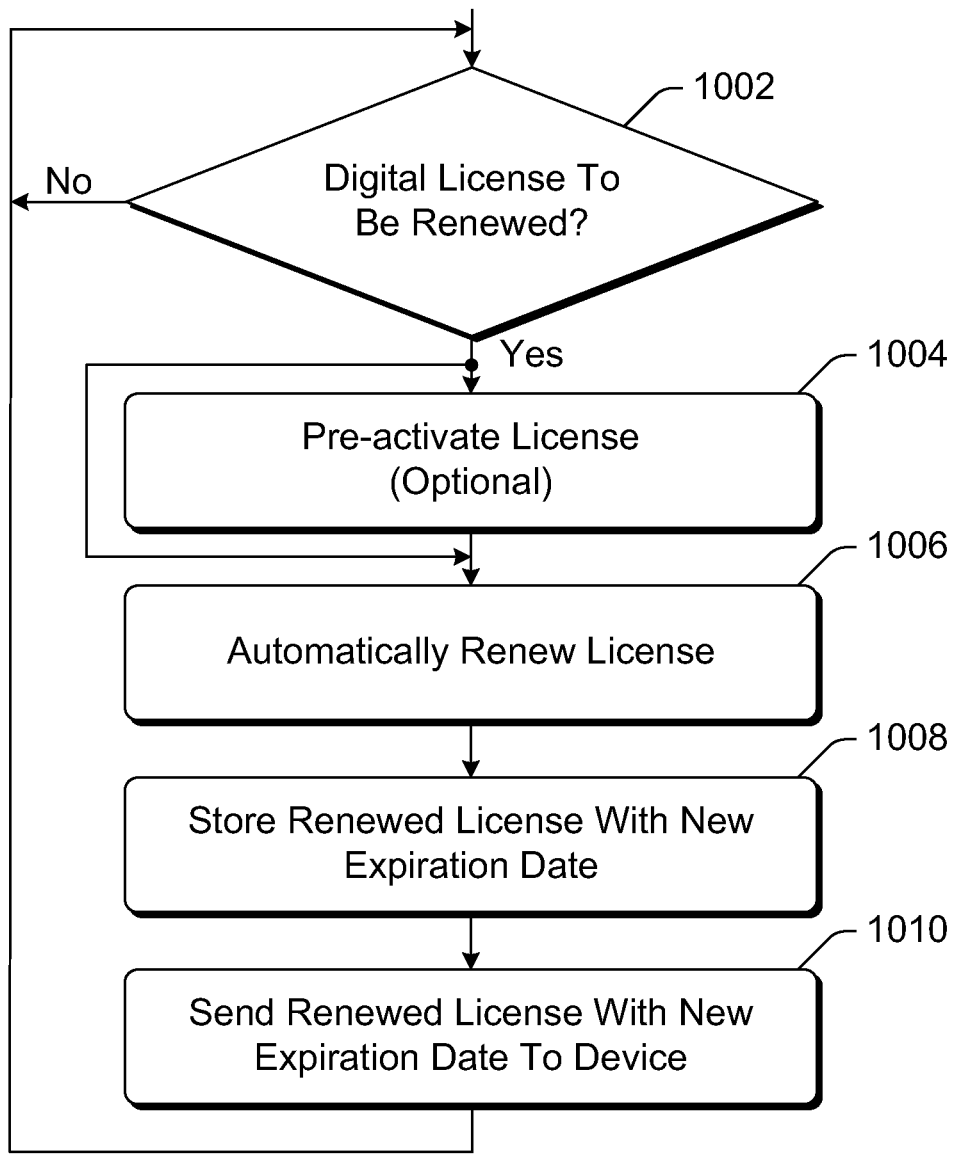
FIG. 10 is a flowchart illustrating an example process for automatically updating time-based licenses in accordance with one or more embodiments.

FIG. 10 is a flowchart illustrating an example process 1000 for automatically updating time-based licenses in accordance with one or more embodiments. Process 1000 is carried out by one or more services, such as a license management service 204 of FIG. 2 or a license management system 502 of FIG. 5, and can be implemented in software, firmware, hardware, or combinations thereof. Process 1000 is an example process for automatically updating time-based licenses; additional discussions of automatically updating time-based licenses are included herein with reference to different figures.

In process 1000, a check is made as to whether a digital license is to be renewed (act 1002). This check is made, for example, based on whether the digital license is a time-based license and on whether the user has requested automatic renewal of the license. Process 1000 performs this check at regular or irregular intervals until it is determined that the digital license is to be renewed.

If the digital license is to be renewed, then the license is optionally pre-activated (act 1004). In some situations, if the digital license for a product is to be renewed, a new product key for the product is obtained or the previous product key is maintained but is to be re-activated by the software activation service (e.g., service 212 of FIG. 2). In such situations, the software activation service is accessed in act 1004 to pre-activate the product key for the renewed digital license.

Regardless of whether the license is pre-activated in act 1004, the digital license is automatically renewed (act 1006). This automatic renewal is independent of whether the having the user ID to which the digital license is bound is currently logged in to the online service (e.g., via user ID authentication service 214 of FIG. 2). Rather, the renewal is done automatically on behalf of the user.

The renewed license with a new expiration date is stored (act 1008). This storing of the renewed license can be performed in a variety of different manners, such as replacing the previous version of the digital license, modifying the previous version of the digital license to include the new expiration date, and so forth.

This renewed license with the new expiration date is sent to the device (act 1010). In one or more embodiments, this sending occurs the next time the digital license is requested by the device. Alternatively, this sending can occur at different times, such as the next time the user logs in to the online service (e.g., via user ID authentication service 214 of FIG. 2).

Process 1000 then returns to act 1002 to continue to check whether a digital license is to be renewed.

It should be noted that the binding of a digital license to a user ID and storage of the digital license at a license management service as discussed above allows for a variety of different usage scenarios. A user purchasing a software product purchases a set of rights for using the software product, and that set of rights is reflected in the terms of the digital license. The user activates the software product using the product key, and has that product key maintained by the license management service by binding the digital license to the user ID of the user. If the user subsequently desires to re-install the software product (e.g., because the previous installation was removed as a result of a repair to his or her device, because the user buys a new device, and so forth), he or she can obtain the digital license (including the product key) from the license management service rather than needing to find the disc or box with the product key that he or she purchased.

The user is further able to access the software products that he or she has purchased from a variety of different devices. This can be viewed as allowing the user's software product or digital license to roam with the user to different devices. For example, assume a user has activated and installed a software product on his or her home computer, and has also had a digital license for the software product bound to his or her user ID stored in the license management service. If the user travels away from home and desires to use that software product on another computer, the user can login to the online service using his or her user ID and have the digital license for that software product retrieved in order to run the software product on that other computer.

Using the techniques discussed herein, it can be seen that the digital licenses for software products are associated with particular users via their user IDs. Thus, rather than being bound to a particular device or hardware configuration, the digital licenses are bound to the particular user IDs.

The digital license is digitally signed by software activation service 212 when the digital license is created, as discussed above. Additionally, various changes can be made to the digital license by license client module 232 or service 204 (or license management system 502 of FIG. 5), such as to add the user ID to the digital license, to change an expiration date of the license, and so forth. When such changes are made to the digital license, the changed digital license is digitally signed using a private key of a public/private key pair of the signer. The service or module making the change (e.g., service 204 of system 502 or module 232) can be the signer, or alternatively the service or module making the change can communicate with software activation service 212 to have service 212 sign the changed digital license.

Figure 11:
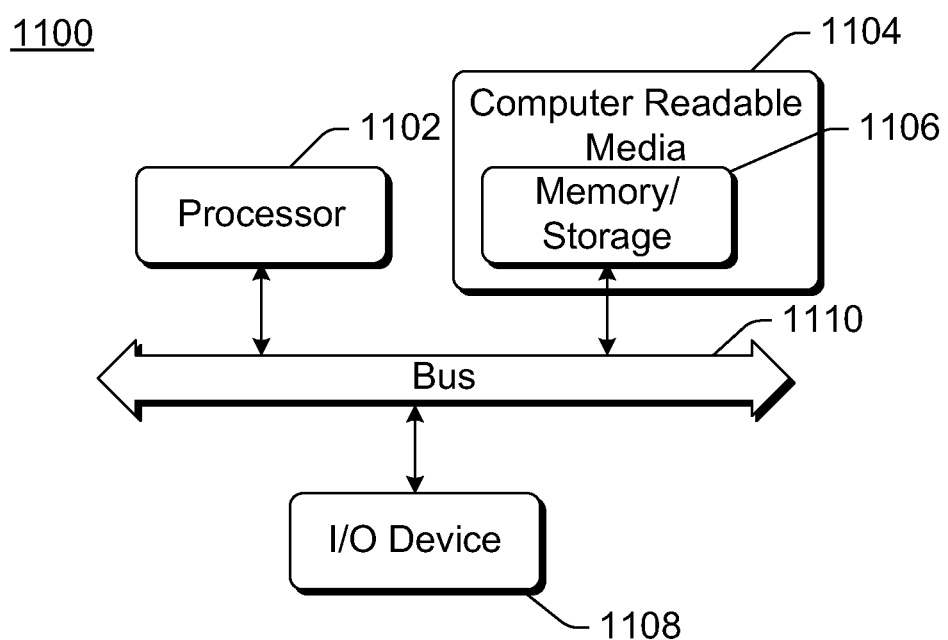
FIG. 11 illustrates an example computing device that can be configured to implement the availability of permission models in roaming environments in accordance with one or more embodiments.

FIG. 11 illustrates an example computing device 1100 that can be configured to implement the availability of permission models in roaming environments in accordance with one or more embodiments. Computing device 1100 can be, for example, device 102 of FIG. 1 or device 202 of FIG. 2, or can implement at least a portion of one or more services 104 or 108 of FIG. 1, or services 204 or 212-222 of FIG. 2, or system 502 of FIG. 5.

Computing device 1100 includes one or more processors or processing units 1102, one or more computer readable media 1104 which can include one or more memory and/or storage components 1106, one or more input/output (I/O) devices 1108, and a bus 1110 that allows the various components and devices to communicate with one another. Computer readable media 1104 and/or one or more I/O devices 1108 can be included as part of, or alternatively may be coupled to, computing device 1100. Bus 1110 represents one or more of several types of bus structures, including a memory bus or memory controller, a peripheral bus, an accelerated graphics port, a processor or local bus, and so forth using a variety of different bus architectures. Bus 1110 can include wired and/or wireless buses.

Memory/storage component 1106 represents one or more computer storage media. Component 1106 can include volatile media (such as random access memory (RAM)) and/or nonvolatile media (such as read only memory (ROM), Flash memory, optical disks, magnetic disks, and so forth). Component 1106 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1102. It is to be appreciated that different instructions can be stored in different components of computing device 1100, such as in a processing unit 1102, in various cache memories of a processing unit 1102, in other cache memories of device 1100 (not shown), on other computer readable media, and so forth. Additionally, it is to be appreciated that the location where instructions are stored in computing device 1100 can change over time.

One or more input/output devices 1108 allow a user to enter commands and information to computing device 1100, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 11. The features of the availability of permission models in roaming environments techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for use at a computer system, the method comprising:
    receiving over a network a request for a digital license for a software product installed at a computing device, the request including a user ID of a user of the computing device;
    in response to receiving the request, determining that the installed software product can be used at the computing device, including:
        referring to a storage device to access a stored record of digital licenses bound to the user ID, the stored record of digital licenses including a digital license for the software product, the stored record updated on an ongoing basis in response to other installations and removals of the digital license at one or more other computing devices monitored over the network, the stored record representing current usage of the software product by the user ID; and
        licensing use of the installed software product by the user at the computing device by determining the request satisfies terms defined within the digital license in view of the represented current usage of the software product by the user ID; in response to the determination:
        automatically further updating the stored record to modify the represented current usage to reflect licensed use of the software product by the user at computing device; and
        returning, to the computing device, an indication that the installed software product is licensed for use by the user at the computing device in accordance with the defined terms of the digital license.

2. The method as recited in claim 1, wherein receiving a request for a digital license comprises receiving a request that was sent from the computing device in response to the computing device detecting the presence of a hardware device at the computing device, the hardware device associated with a product key for the software product and with the user ID.

3. The method as recited in claim 2, wherein returning an indication that the software product is licensed for use comprises returning the digital license along with the user ID to the computing device.

4. The method as recited in claim 1, wherein the computing device is a different device than another computing device from which a product key for the digital license was previously activated.

5. The method as recited in claim 1, wherein the defined terms of the digital license include time based usage restrictions defining a duration of use for using the software product at the computing device.

6. The method as recited in claim 1, wherein determining that the installed software product can be used at the computing device comprises determining that the user can use executable functionality of an installed executable program at the computing device.

7. The method as recited in claim 1, wherein the digital license includes an expiration date, and the digital license can be returned to the device in accordance with the terms of the digital license only if the expiration date has not passed.

8. The method as recited in claim 1, wherein receiving a request for a digital license comprises receive a request for a digital license that was sent from the computing device in response to detecting that a license for the software product was not locally available at the computing device.

9. One or more computer storage media having stored thereon multiple instructions that, when executed by one or more processors of a computer system, cause the one or more processors to:
    receive over a network a request for a digital license for a software product installed at a computing device, the request including a user ID of a user of the computing device;
    in response to receiving the request, determine that the installed software product can be used at the computing device, including:
        refer to a storage device to access a stored record of digital licenses bound to the user ID, the stored record of digital licenses including a digital license for the software product, the stored record updated on an ongoing basis in response to other installations and removals of the digital license at one or more other computing devices monitored over the network, the stored record representing current usage of the software product by the user ID; and
        license use of the installed software product by the user at the computing device by determining the request satisfies terms defined within the digital license in view of the represented current usage of the software product by the user ID; and
    in response to the determination:
        automatically further update the stored record by modify the represented current usage to reflect licensed use of the software product by the user at computing device; and
        return to the computing device, an indication that the installed software product is licensed for use by the user at the computing device in accordance with the defined terms of the digital license.

10. One or more computer storage media as recited in claim 9, wherein the multiple instructions that, when executed, cause the one or more processors to receive over a network a request for a digital license for a software product comprise the multiple instructions that, when executed, cause the one or more processors to receive a request that was sent from the computing device in response to the computing device detecting the presence of a hardware device at the computing device, the hardware device associated with a product key for the software product and with the user ID.

11. A computer system, the computer system comprising:
    one or more processors;
    system memory coupled to the one or more processors, the system memory storing executable instructions; and
    the one or more processors configured to execute the executable instructions to:
        receive over a network a request for a digital license for a software product installed at a computing device, the request including a user ID of a user of the computing device;
        in response to receiving the request, determine that the installed software product can be used at the computing device, including:
            refer to a storage device to access a stored record of digital licenses bound to the user ID, the stored record of digital licenses including a digital license for the software product, the stored record updated on an ongoing basis in response to other installations and removals of the digital license at one or more other computing devices monitored over the network, the stored record representing current usage of the software product by the user ID; and license use of the installed software product by the user at the computing device by determining the request satisfies terms defined within the digital license in view of the represented current usage of the software product by the user ID; and in response to the determination:

automatically further update the stored record by modify the represented current usage to reflect licensed use of the software product by the user at computing device; and return to the computing device, an indication that the installed software product is licensed for use by the user at the computing device in accordance with the defined terms of the digital license.

12. The system as recited in claim 11, wherein the one or more processors configured to execute the executable instructions to receive a request for a digital comprises the one or more processors configured to execute the executable instructions to receive a request that was sent from the computing device in response to the computing device detecting the presence of a hardware device at the computing device, the hardware device associated with a product key for the software product and with the user ID.

13. The system as recited in claim 11, wherein the one or more processors configured to execute the executable instructions to return an indication that the software product is licensed for use comprises the one or more processors configured to execute the executable instructions to return the digital license along with the user ID to the computing device.

14. The system as recited in claim 11, wherein the computing device is a different device than another computing device from which a product key for the digital license was previously activated.

15. The system as recited in claim 14, wherein the one or more processors configured to execute the executable instructions to receive over a network a request for a digital license for a software product comprises the one or more processors configured to execute the executable instructions to receive a request that includes the product key, wherein the product key was generated by an original equipment manufacturer (OEM).

16. The system as recited in claim 11, wherein the defined terms of the digital license include time based usage restrictions defining a duration of use for using the software product at the computing device.

17. The system as recited in claim 16, wherein the one or more processors configured to execute the executable instructions to determine that the installed software product can be used at the computing device comprises the one or more processors configured to execute the executable instructions to determine that the user can use executable functionality of an installed executable program at the computing device for the defined duration.

18. The system as recited in claim 11, wherein the digital license includes an expiration date, and the digital license can be returned to the device in accordance with the terms of the digital license only if the expiration date has not passed.

19. The system as recited in claim 11, wherein the one or more processors configured to execute the executable instructions to receive a request for a digital license comprise the one or more processors configured to execute the executable instructions to receive a request for a digital license that was sent from the computing device in response to detecting that a license for the software product was not locally available at the computing device.

20. The system as recited in claim 11, wherein the one or more processors configured to execute the executable instructions to license use of the installed software product by the user at the computing device comprises the one or more processors configured to execute the executable instructions to check the request against a global software license ID that distinguishes the digital license from other digital licenses.

* * * * *